United States Patent
Hu

(10) Patent No.: US 12,395,615 B2
(45) Date of Patent: Aug. 19, 2025

(54) DATA PROCESSING METHOD AND APPARATUS FOR IMMERSIVE MEDIA, RELATED DEVICE, AND STORAGE MEDIUM

(71) Applicant: TENCENT TECHNOLOGY (SHENZHEN) COMPANY LIMITED, Shenzhen (CN)

(72) Inventor: Ying Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 154 days.

(21) Appl. No.: 17/993,852

(22) Filed: Nov. 23, 2022

(65) Prior Publication Data

US 2023/0088144 A1  Mar. 23, 2023

Related U.S. Application Data

(63) Continuation of application No. PCT/CN2022/080257, filed on Mar. 11, 2022.

(30) Foreign Application Priority Data

Jun. 11, 2021  (CN) .......................... 202110659190.8

(51) Int. Cl.
*H04N 13/178* (2018.01)
*H04N 13/161* (2018.01)
*H04N 19/597* (2014.01)

(52) U.S. Cl.
CPC ......... *H04N 13/178* (2018.05); *H04N 13/161* (2018.05); *H04N 19/597* (2014.11)

(58) Field of Classification Search
CPC ... H04N 13/178; H04N 19/597; H04N 13/161
See application file for complete search history.

(56) References Cited

U.S. PATENT DOCUMENTS 10,404,411 B2   9/2019   Chen et al.
10,542,297 B2   1/2020   Chen et al.
(Continued)

FOREIGN PATENT DOCUMENTS

| CN | 111264058 A | 6/2020 |
|---|---|---|
| CN | 112492289 A | 3/2021 |
| CN | 112804256 A | 5/2021 |
| WO | 2019066191 A1 | 4/2019 |

OTHER PUBLICATIONS

The World Intellectual Property Organization (WIPO) International Search Report for PCT/CN2022/080257 May 17, 2022 8 Pages (including translation).

(Continued)

*Primary Examiner* — Jonathan R Messmore
(74) *Attorney, Agent, or Firm* — Anova Law Group, PLLC

(57) ABSTRACT

A data processing method includes: acquiring a free-view information data box corresponding to an $i^{th}$ track of immersive media, the free-view information data box including view information corresponding to the $i^{th}$ track, i being an integer greater than or equal to 1 and less than or equal to M; and decoding images encapsulated in the $i^{th}$ track according to the view information in the free-view information data box, where the immersive media are formed by images taken by N cameras from different views, the immersive media is encapsulated into M tracks, and images from at least one camera are encapsulated in one track. N and M are integers greater than 1.

19 Claims, 10 Drawing Sheets

---

Encapsulate the immersive media into M tracks, the immersive media being formed by images taken by N cameras from different views, images from at least one camera being encapsulated in one track, the M tracks belonging to a same track group — S501

Generate a free-view information data box corresponding to an ith track according to an encapsulation process of w images in the ith track — S502

(56) References Cited

U.S. PATENT DOCUMENTS

| | | | |
|---|---|---|---|
| 10,623,635 B2 | 4/2020 | Wang et al. | |
| 10,742,999 B2 | 8/2020 | Wang et al. | |
| 10,805,620 B2 | 10/2020 | Wang et al. | |
| 10,820,025 B2 | 10/2020 | Lai et al. | |
| 10,924,820 B2 | 2/2021 | Chen et al. | |
| 10,951,874 B2 | 3/2021 | Chen et al. | |
| 11,139,000 B2 | 10/2021 | Wang et al. | |
| 11,197,040 B2 | 12/2021 | Wang et al. | |
| 11,804,042 B1* | 10/2023 | Alokhina | G06V 10/776 |
| 2003/0214502 A1* | 11/2003 | Park | G06T 15/405 |
| | | | 345/419 |
| 2010/0128112 A1 | 5/2010 | Marti et al. | |
| 2015/0042812 A1* | 2/2015 | Tang | G06V 20/647 |
| | | | 348/157 |
| 2018/0047213 A1* | 2/2018 | Woo | G06T 19/006 |
| 2018/0075576 A1 | 3/2018 | Liu et al. | |
| 2019/0019218 A1 | 1/2019 | Thompson et al. | |
| 2020/0021791 A1* | 1/2020 | Hur | H04N 21/6587 |
| 2020/0228777 A1 | 7/2020 | Dore et al. | |
| 2020/0365125 A1* | 11/2020 | Senn | G06F 3/017 |
| 2020/0382764 A1 | 12/2020 | Oyman et al. | |
| 2021/0006614 A1* | 1/2021 | Oyman | H04N 21/21805 |
| 2021/0097724 A1* | 4/2021 | Roimela | H04N 19/70 |
| 2021/0134058 A1* | 5/2021 | Ito | G06T 7/194 |
| 2021/0385423 A1* | 12/2021 | Oh | H04N 19/597 |
| 2022/0159261 A1 | 5/2022 | Oh | |
| 2022/0329641 A1* | 10/2022 | Giladi | H04N 21/4621 |

OTHER PUBLICATIONS

Shuai Zhao et al., "Study of User QoE Improvement for Dynamic Adaptive Streaming Over HTTP (MPEG-DASH)", 2017, pp. 566-570. International Conference on Networking and Communications (ICNC).

Xiang Zhang et al., "Linear Model based Geometry Coding for Lidar Acquired Point Clouds", 2020, pp. 406-406. 2020 Data Compression Conference (DCC), Snowbird, UT, USA.

Min Zhang et al., "PointHop: An Explainable Machine Learning Method for Point Cloud Classification", 2000, IEEE TMM.

Li Li et al., "Occupancy-Map-Based Rate Distortion Optimization for Video-Based Point Cloud Compression", 2019, ICIP.

Li Li et al., "Occupancy-map-based Rate Distortion Optimization and Partition for Video-based Point Cloud Compression ", 2020, IEEE TCSVT.

Li Li et al., "Video-based compression for plenoptic point clouds", arXiv:1911.01355.

Li Li et al., "$\lambda$-domain Perceptual Rate Control for 360-degree Video Compression", 2020, IEEE Journal on Selected Topics in Signal Processing.

Li Li et al ., "Rate Control for Video-based Point Cloud Compression", 2020, IEEE TIP.

Li Li et al ., "Efficient Projected Frame Padding for Video-based Point Cloud Compression", 2019, IEEE TMM.

Min Zhang et al., "Unsupervised Feedforward Feature (UFF) Learning for Point Cloud Classification and Segmentation", Dec. 1-4, 2020, 2020 IEEE International Conference on Visual Communications and Image Processing (VCIP),Macau.

Pranav Kadam et al., "Unsupervised Point Cloud Registration via Salient Points Analysis (SPA)", Dec. 1-4, 2020, 2020 IEEE International Conference on Visual Communications and Image Processing (VCIP), Macau.

"Information technology—Coding of audio-visual objects—Part 12: ISO base media file format", Sep. 2022, ISO/IEC JTC 1/SC 29/WG 11.

"Information technology—Virtual Reality Content Representation—Part 2: Video", Mar. 17, 2021.

* cited by examiner

DATA PROCESSING METHOD AND APPARATUS FOR IMMERSIVE MEDIA, RELATED DEVICE, AND STORAGE MEDIUM

RELATED APPLICATION(S)

This application is a continuation application of PCT Patent Application No. PCT/CN2022/080257 filed on Mar. 11, 2022, which claims priority to Chinese Patent Application No. 202110659190.8, filed with the Chinese Patent Office on Jun. 11, 2021 and entitled "DATA PROCESSING METHOD AND APPARATUS FOR IMMERSIVE MEDIA, RELATED DEVICE, AND STORAGE MEDIUM", all of which are incorporated herein by reference in entirety.

FIELD OF THE TECHNOLOGY

The present disclosure relates to the field of audio and video, and in particular, to media data processing.

BACKGROUND

Immersive media refer to media content that can create an immersive experience for consumers. The immersive media may also be called free-view video. For the free-view video, a same 3D scene is generally photographed from multiple angles by a camera array to obtain depth images and/or texture images from different views, and such depth images and/or texture images constitute the free-view video. A content consumption device may choose, according to a current position of a user and views of a camera that various images are from, to decode some images for consumption.

During production of the free-view video, a large-scale atlas information data box is generally used to indicate parameter information associated with the free-view video (such as widths and heights of resolution of depth images and texture images captured by the camera, and a camera identifier corresponding to each view), to omit remaining atlas information in an atlas track.

SUMMARY

Embodiments of the present disclosure provide a data processing method and apparatus for immersive media, a device, and a storage medium, which can encapsulate images captured by cameras of immersive media from different views into a plurality of different tracks, and use a free-view information data box corresponding to each track to indicate view information of the camera that the image in each track is from, to facilitate a content consumption device to select an appropriate image for decoding and consumption according to the view information in each track and a current position of a user.

In one aspect, the present disclosure provides a data processing method for immersive media, the immersive media being formed by images taken by N cameras from different views, the immersive media being encapsulated into M tracks, images from at least one camera being encapsulated in one track, N and M being integers greater than 1, the data processing method including: acquiring a free-view information data box corresponding to an $i^{th}$ track, the free-view information data box including view information corresponding to the $i^{th}$ track, i being an integer greater than or equal to 1 and less than or equal to M; and decoding images encapsulated in the $i^{th}$ track according to the view information in the free-view information data box.

According to the embodiments of the present disclosure, a content consumption device can select an appropriate image for decoding and consumption according to view information in each track and a current position of a user.

In another aspect, the present disclosure provides a processing method for immersive media, including: encapsulating the immersive media into M tracks, the immersive media being formed by images taken by N cameras from different views, images from at least one camera being encapsulated in one track, the M tracks belonging to a same track group, N and M being integers greater than or equal to 1; and generating a free-view information data box corresponding to an $i^{th}$ track according to an encapsulation process of w images in the $i^{th}$ track, the free-view information data box including view information corresponding to the $i^{th}$ track; $1 \leq i \leq M$, and $w \geq 1$.

In yet another aspect, the present disclosure provides a data processing apparatus for immersive media, including: a memory storing computer program instructions; and a processor coupled to the memory and configured to execute the computer program instructions and perform: acquiring a free-view information data box corresponding to an $i^{th}$ track, the free-view information data box including view information corresponding to the $i^{th}$ track, i being an integer greater than or equal to 1 and less than or equal to M; and decoding images encapsulated in the $i^{th}$ track according to the view information in the free-view information data box.

In yet another aspect, the present disclosure provides a data processing apparatus for immersive media, including: a memory storing computer program instructions; and a processor coupled to the memory and configured to execute the computer program instructions and perform: encapsulating the immersive media into M tracks, the immersive media being formed by images taken by N cameras from different views, images from at least one camera being encapsulated in one track, the M tracks belonging to a same track group, N and M being integers greater than or equal to 1; and generating a free-view information data box corresponding to an $i^{th}$ track according to an encapsulation process of w images in the $i^{th}$ track, the free-view information data box including view information corresponding to the $i^{th}$ track; $1 \leq i \leq M$, and $w \geq 1$.

In yet another aspect, the present disclosure provides a non-transitory computer-readable storage medium storing computer program instructions executable by at least one processor to perform: acquiring a free-view information data box corresponding to an $i^{th}$ track of immersive media, the free-view information data box including view information corresponding to the $i^{th}$ track, i being an integer greater than or equal to 1 and less than or equal to M; and decoding images encapsulated in the $i^{th}$ track according to the view information in the free-view information data box, the immersive media being formed by images taken by N cameras from different views, the immersive media being encapsulated into M tracks, images from at least one camera being encapsulated in one track, N and M being integers greater than 1.

In the embodiments of the present disclosure, immersive media are encapsulated into M tracks, the immersive media are formed by images taken by N cameras from different views, one track may include images from at least one camera, and the M tracks belong to a same track group, which realizes a scene of encapsulating an immersive video into a plurality of tracks. In addition, the content production device generates a free-view information data box for each track, and indicates view information corresponding to an $i^{th}$ track through the free-view information data box corresponding to the $i^{th}$ track, for example, a specific view position of the camera, and when the content consumption device decodes the images in the track according to the view information corresponding to the $i^{th}$ track, decoded video can be ensured to better match a position of a user, which improves a presentation effect of the immersive video.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

The embodiments of the present disclosure relate to a data processing technology for immersive media. The so-called immersive media refer to media files that can provide immersive media content so that users immersed in the media content can obtain visual, auditory, and other sensory experiences in the real world. In certain embodiment(s), the immersive media may be 3DoF immersive media, 3DoF+ immersive media, or 6DoF immersive media.

Figure 1A:
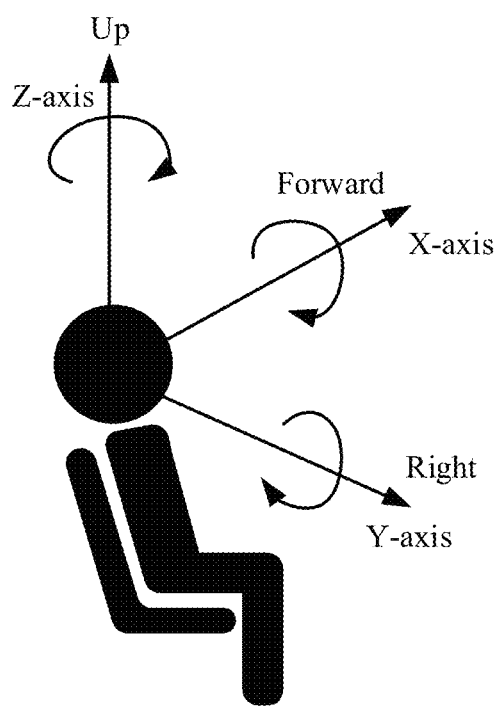
FIG. 1a is a schematic diagram of a user consuming 3 Degree of Freedom (3DoF) immersive media according to certain embodiment(s) of the present disclosure.
Figure 1B:
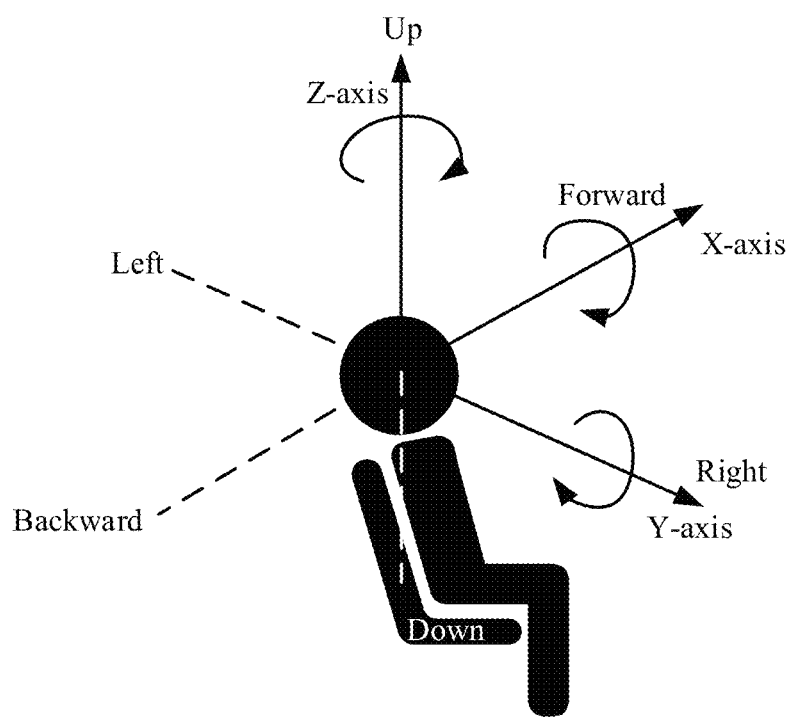
FIG. 1B is a schematic diagram of a user consuming 3DoF+ immersive media according to certain embodiment(s) of the present disclosure.
Figure 1C:
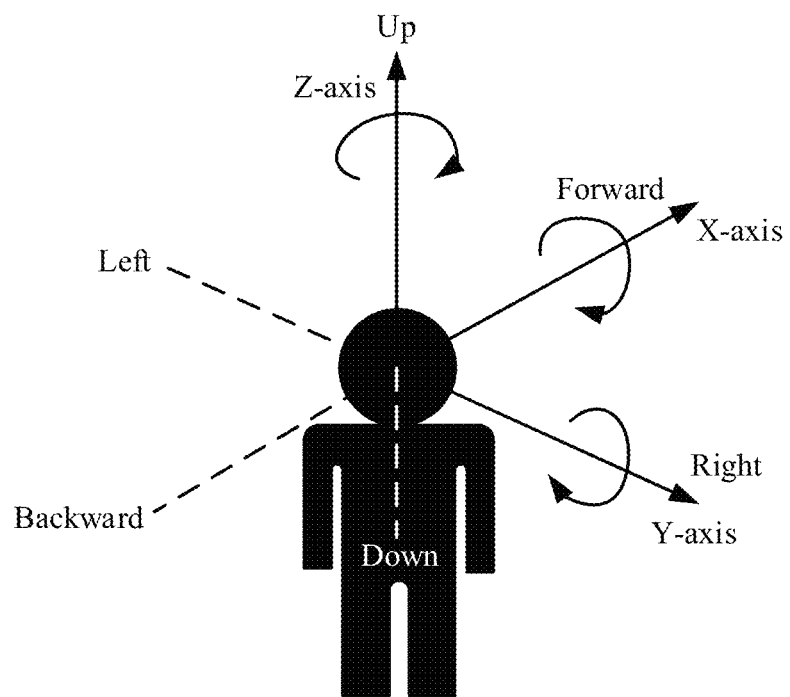
FIG. 1c is a schematic diagram of a user consuming 6 Degree of Freedom (6DoF) immersive video according to certain embodiment(s) of the present disclosure.

Refer to FIG. 1a which is a schematic diagram of a user consuming 3DoF immersive media according to an embodiment of the present disclosure. The 3DoF immersive media shown in FIG. 1a means that the user is fixed at a center point of a 3-dimension (3D) space, and the user's head rotates along an X axis, a Y axis, and a Z axis to watch pictures provided by media content of the immersive media. Refer to FIG. 1B which is a schematic diagram of a user consuming 3DoF+ immersive media according to an embodiment of the present disclosure. 3DoF+ means that when a virtual scene provided by the immersive media has certain depth information, the user's head can move in a limited space based on 3DoF to watch pictures provided by media content. Refer to FIG. 1c which is a schematic diagram of a user consuming 6DoF immersive video according to an embodiment of the present disclosure. 6DoF is divided into window 6DoF, omnidirectional 6DoF, and 6DoF. The window 6DoF means that the user has restricted rotation and movement in the X axis and the Y axis and restricted translation in the Z axis. For example, the user cannot see outside a window frame, and the user cannot see through a window. The omnidirectional 6DoF means that the user has restricted rotation and movement in the X axis, the Y axis, and the Z axis. For example, the user cannot freely pass through 3D 360-degree virtual reality (VR) content in a restricted movement region. The 6DoF means that the user can freely translate along the X axis, the Y axis, and the Z axis. For example, the user can freely walk in the 3D 360-degree VR content. In short, the 6DoF immersive video allows the user to rotate and consume media content along the X axis, the Y axis, and the Z axis, and also to freely move along the X axis, the Y axis, and the Z axis to consume the media content.

Content of the immersive media includes video content represented in the 3D space in various forms, such as 3D video content represented in a spherical form. In certain embodiment(s), the content of the immersive media may be VR video content, multi-view video content, panoramic video content, spherical video content, or 360-degree video content. Therefore, the immersive media may also be referred to as VR video, free-view video, panoramic video, spherical video, or 360-degree video. In addition, the content of the immersive media further includes audio content synchronized with video content represented in the 3D space.

Figure 2A:
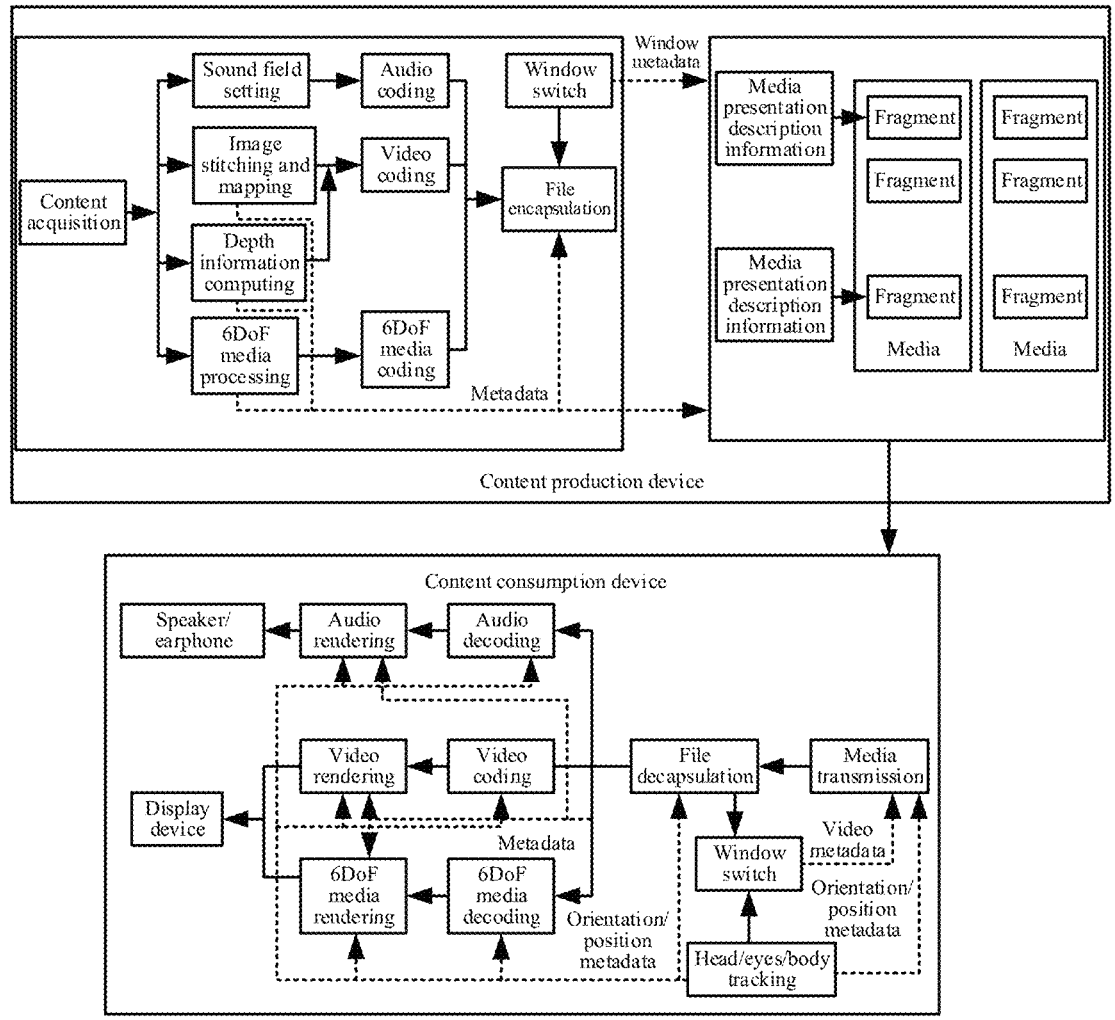
FIG. 2a is a schematic architectural diagram of an immersive media system according to certain embodiment(s) of the present disclosure.

Refer to FIG. 2a which is an architectural diagram of an immersive media system according to an embodiment of the present disclosure. The immersive media system shown in FIG. 2a includes a content production device and a content consumption device. The content production device may refer to a computing device used by a provider of immersive media (e.g., a content producer of immersive content). The computing device may be a terminal, such as a smartphone, a tablet computer, a notebook computer, a desktop computer, a smart speaker, a smart watch, or a smart vehicle-mounted terminal. The computing device may further be a server, for example, it may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middle-ware service, a domain name service, a security service, a content delivery network (CDN), big data, and an artificial intelligence platform.

The content consumption device may refer to a computing device used by a user of immersive media (e.g., a user). The computing device may be a terminal, for example, a personal computer, a smart mobile device such as a smartphone, or a VR device (such as a VR headset or VR glasses). A data processing process of immersive media includes a data processing process on the side of the content production device and a data processing process on the side of the content consumption device.

The data processing process on the side of the content production device includes: (1) a process of acquiring and producing media content of the immersive media; and (2) a process of encoding and encapsulating the immersive media. The data processing process on the side of the content consumption device includes: (3) a process of decapsulating and decoding the immersive media; and (4) a process of rendering the immersive media. In addition, a transmission process of the immersive media is involved between the content production device and the content consumption device. The transmission process may be performed based on various transport protocols. The transport protocols may include, but are not limited to, dynamic adaptive streaming over HTTP (DASH) protocols, HTTP live streaming (HLS) protocols, smart media transport protocols (SMTPs), transmission control protocols (TCPs), and the like.

Figure 2B:
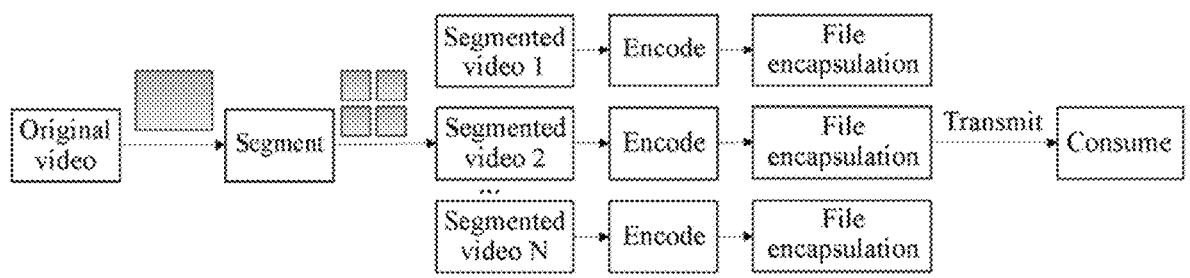
FIG. 2b is a schematic diagram of a transmission scheme for immersive media according to certain embodiment(s) of the present disclosure.

Refer to FIG. 2b which is a schematic diagram of a transmission scheme for immersive media according to an embodiment of the present disclosure. As shown in FIG. 2b, in order to solve the problem of a transmission bandwidth load caused by an excessively large amount of data in the immersive media. During the processing of the immersive media, original immersive media is generally divided into a plurality of pieces of segmented video in space, which are respectively encoded and encapsulated and transmitted to clients for consumption. The data processing process of the immersive media is introduced in detail below with reference to FIG. 2b. The data processing process on the side of the content production device is first introduced:

(1) the process of acquiring and producing the media content of the immersive media:

S1: Process of acquiring the media content of the immersive media.

The media content of the immersive media is obtained by capturing real-world sound-visual scenes through a capture device. In an embodiment, the capture device may refer to a hardware component provided in the content production device. For example, the capture device refers to a microphone, a camera, a sensor, or the like of a terminal. In other embodiments, the capture device may also be a hardware apparatus independent of the content production device but connected to the content production device, for example, a camera connected to a server. The capture device may include, but is not limited to, an audio device, a camera device, and a sensor device. The audio device may include an audio sensor, a microphone, and the like. The camera device may include an ordinary camera, a stereo camera, a light field camera, and the like. The sensor device may include a laser device, a radar device, and the like. A plurality of capture devices may be provided. The capture devices may be deployed in some specific views in real space to simultaneously capture audio content and video content from different views in the space. The captured audio content and video content are synchronized in time and space. For example, media content of the 3DoF immersive media is recorded by a set of cameras or a camera device with a plurality of cameras and sensors, while media content of the 6DoF immersive media is produced by content in the form of point cloud and light fields shot by a camera array.

S2: Process of producing the media content of the immersive media.

The captured audio content is content suitable for audio coding of to-be-executed immersive media, so no additional processing on the captured audio content is needed. The captured video content can be called content suitable for audio coding of to-be-executed immersive media only after going through a series of production procedures. The production procedures may include:

① Stitching: Since the captured video content of the immersive media is shot by the capture device from different views, stitching means stitching the video content shot from various views into a video that can reflect a 360-degree visual panorama of the real space. That is, the stitched video is a panoramic video represented in the 3D space.

② Projection: Projection refers to a process of mapping a 3D video formed by stitching onto a 2-dimension (2D) image. A 2D image formed by projection is called a projected image. Manners of projection may include, but are not limited to, equirectangular projection, and cubemap projection.

The capture device can only capture the panoramic video. After such a video is processed by the content production device and transmitted to the content consumption device for corresponding data processing, users on the side of the content consumption device side can only watch 360-degree video information through some specific actions (e.g., head rotation), but performing a non-specific action (e.g., moving a head) does not result in a corresponding video change, leading to a poor VR experience. Therefore, there is a desire to provide additional depth information matching the panoramic video to enable the users to obtain better immersion and a better VR experience, which involves a variety of production technologies. Common production technologies include a 6DoF production technology, a 3DoF production technology, and a 3DoF+ production technology.

Immersive media obtained by using the 6DoF production technology and the 3DoF+ production technology may include free-view video. As common 3DoF+ and 6DoF immersive media, the free-view video is immersive media video captured by a plurality of cameras and including different views, which supports user 3DoF+ or 6DoF interaction. In certain embodiment(s), the 3DoF+ immersive media are recorded by a group of cameras or a camera with a plurality of cameras and sensors. The cameras may generally acquire content in all directions around a center of a device. The 6DoF immersive media are produced by content in the form of point cloud and light fields shot by a camera array.

(3) The process of encoding the media content of the immersive media.

Figure 3A:
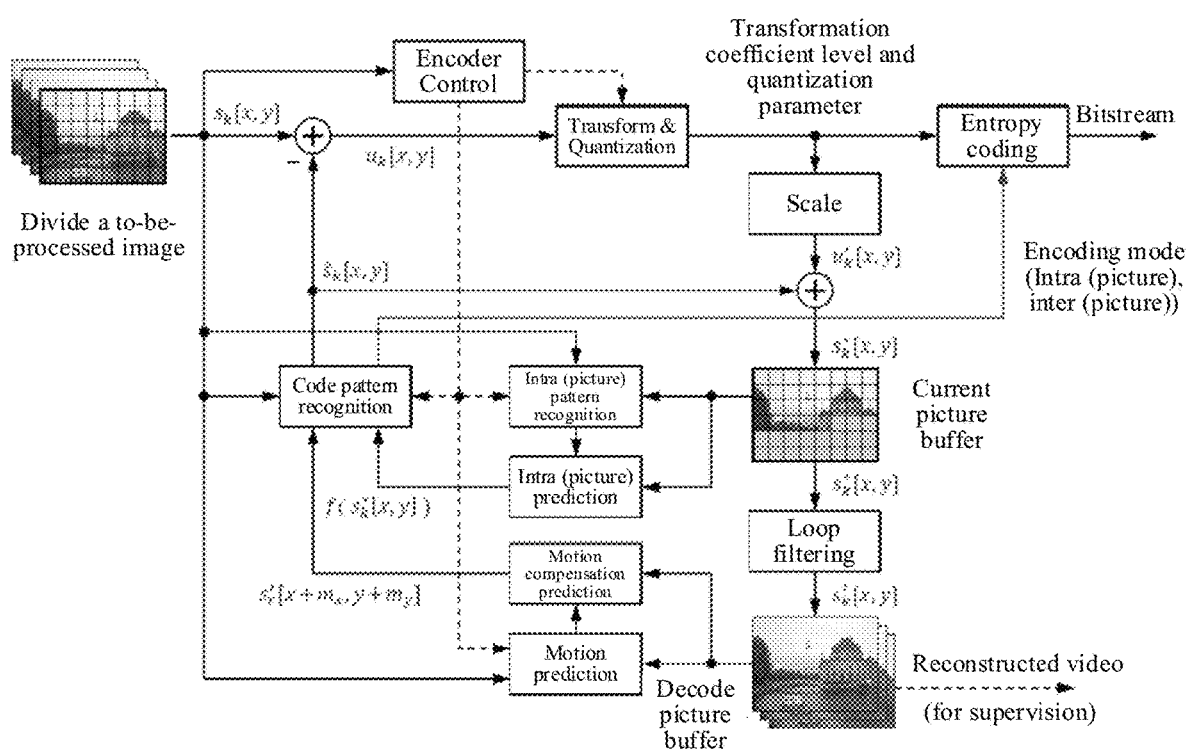
FIG. 3a is a schematic block diagram of video coding according to certain embodiment(s) of the present disclosure.
Figure 3B:
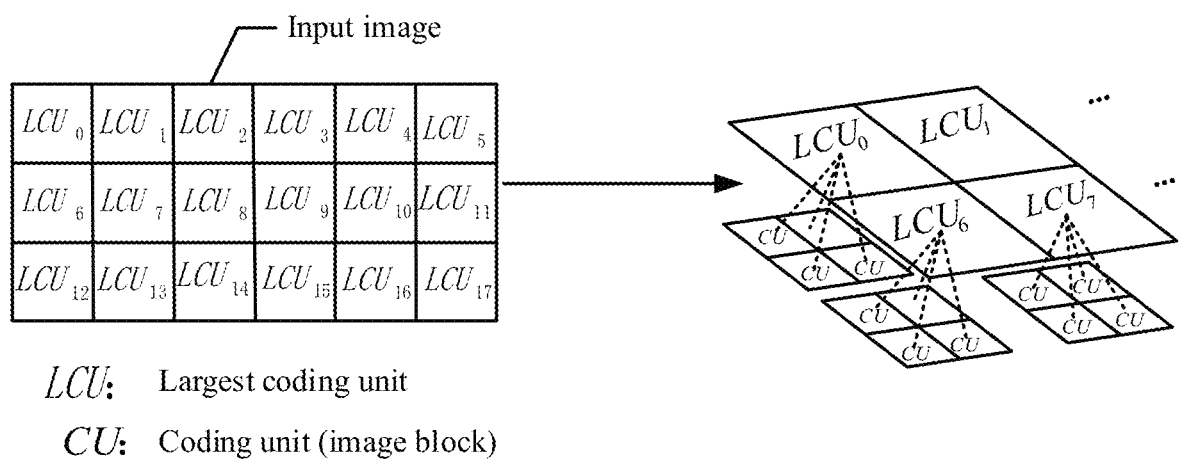
FIG. 3b is a schematic diagram of division of an input image according to certain embodiment(s) of the present disclosure.

The projected image may be directly encoded, or the projected image may be encoded after regional encapsulation. Refer to FIG. 3a which is a basic block diagram of video coding according to an embodiment of the present disclosure. Modern mainstream video coding technologies, for example, an international video coding standard (High Efficiency Video Coding, HEVC), an international video coding standard (Versatile Video Coding, VVC), and a Chinese national video coding standard (Audio Video Coding Standard, AVS), adopt a hybrid coding framework to perform a series of operations and processing on an inputted original video signal as follows:

1) Block partition structure: An input image is divided into several non-overlapping processing units according to sizes of processing units, and similar compression operations are performed for each processing unit. The processing unit is known as a coding tree unit (CTU) or largest coding unit (LCU). The CTU may be further divided into one or more basic coding units, called coding units (CUs). Each CU is one of the most basic elements in coding mitigation. Refer to FIG. 3b which is a schematic diagram of division of an input image according to an embodiment of the present disclosure. Various possible coding manners for each CU are described in the following.

2) Predictive coding: The predictive coding includes intra (picture) prediction and inter (picture) prediction. The original video signal of the immersive media is predicted by a selected reconstructed video signal to obtain a residual video signal. The content production device may determine which of the many possible predictive coding modes is the most appropriate for the current CU and inform the content consumption device. Signals predicted by intra (picture) prediction are from regions of a same image that have been encoded and reconstructed, while signals predicted by inter (picture) prediction are from other images (called reference images) that have been encoded and are different from the current image.

3) Transform & Quantization: Through transformation such as discrete fourier transform (DFT) or discrete cosine transform (DCT), the residual video signal is transferred to a transform domain, which is called a transformation coefficient. The signal in the transform domain further goes through lossy quantization, and some information is lost, which makes the quantized signal conducive to compression expression. In some video coding standards, more than one transformation is available for selection, so the content production device also may select one of the transformations for the current coding CU and inform a content playback device. Fineness of quantization is generally determined by a quantization parameter (QP). A larger value of the QP means that coefficients in a wider value range may be quantized to a same output, which may generally lead to greater distortion and a lower bit rate. Conversely, a smaller value of the QP means that coefficients in a smaller value range may be quantized to a same output, which may generally lead to less distortion and correspond to a higher bit rate.

4) Entropy coding or statistical coding Statistical compression coding is performed on the quantized signal in the transform domain according to frequencies of the values, and finally a binary (0 or 1) compressed bitstream is outputted. At the same time, other information generated by coding, such as a selected mode, a motion vector, and the like, also desires entropy coding to reduce the bit rate. Statistical coding is a lossless coding manner, which can effectively reduce a bit rate desired to express a same signal. Common statistical coding is variable length coding (VLC) or content adaptive binary arithmetic coding (CABAC).

5) Loop filtering: After the encoded images go through operations of inverse quantization, inverse transformation, and predictive compensation (reverse operations of the 2 to 4), reconstructed decoded images can be obtained. Compared with the original image, the reconstructed images are different from the original image in some information due to the influence of quantization, resulting in distortion. A degree of distortion caused by the quantization can be effectively reduced by performing a filtering operation on the reconstructed images, such as deblocking, sample adaptive offset (SAO), or adaptive loop filter (ALF). Such filtered reconstructed images may be used as a reference for subsequent encoded images to predict future signals. Therefore, the filtering operation may also be called loop filtering and filtering operations within a coding loop.

If the 6DoF production technology (which is called 6DoF when the user can freely move in a simulated scene) is used, specific coding (such as point cloud coding) may be used for coding during the video coding.

(4) Process of encapsulating the immersive media.

An audio bitstream and a video bitstream are encapsulated into a file container (track) according to a file format (e.g., an ISO base media file format (ISOBMFF)) of the immersive media to form a media resource file of the immersive media. The media resource file may be a media file or a media file of the immersive media formed by media fragments, and metadata of media file resources of the immersive media is recorded according to a file format desire of the immersive media by using media presentation description (MPD). The metadata herein is a general term for information associated with presentation of the immersive media. The metadata may include description information about media content, description information about a window, signaling information about presentation of media content, and the like. As shown in FIG. 2a, the content production device may store MPD and media file resources formed after the data processing process.

The data processing process on the side of the content consumption device is introduced below:

(1) Process of decapsulating and decoding the immersive media.

The content consumption device may obtain media file resources and corresponding MPD of the immersive media from the content production device through recommendation of the content production device or adaptively and dynamically according to a user desire on the side of the content consumption device. For example, the content consumption device may determine orientation and a position of the user according to tracking information of the user's head/eyes/body, and dynamically request the corresponding media file resources from the content production device based on the determined orientation and position. The media file resources and the MPD are transmitted to the content consumption device by the content production device through a transmission mechanism (e.g., DASH or SMT). A decapsulation process of the content consumption device is the opposite of the encapsulation process of the content production device. The content consumption device decapsulates the acquired media file resources according to the file format desire of the immersive media to obtain an audio bitstream and a video bitstream. A decoding process of the content consumption device is the opposite of the encoding process of the content production device. The content consumption device performs audio decoding on the audio bitstream to restore audio content, and the content consumption device decodes the video bitstream to obtain video content. The decoding process of the video bitstream by the content consumption device may include the following: ① The video bitstream is decoded to obtain a planar projected image. ② The projected image is reconstructed according to the MPD to be converted into a 3D image. The reconstructing herein means re-projecting a 2D projected image into the 3D space.

As can be seen from the encoding process, on the side of the content consumption device, for each CU, after obtaining the compressed bitstream, the content consumption device first performs entropy decoding to obtain various code information and quantized transformation coefficients. After repeated quantization and transformation of the coefficients, a residual signal is obtained. On the other hand, a prediction signal corresponding to the CU can be obtained according to the known coding mode information, and the reconstructed signal can be obtained after addition of the two. Finally, a reconstruction value of the decoded image may go through the operation of loop filtering to produce a finally outputted signal.

(2) Process of rendering the immersive media.

The content consumption device renders, according to rendering and window related metadata in the MPD, the audio content obtained by audio decoding and the 3D image obtained by video decoding, and playback output of the 3D image is realized upon performance of the rendering. In particular, if the 3DoF and 3DoF+ production technologies are used, the content consumption device renders the 3D image based on a current viewpoint, parallax, and depth information. If the 6DoF production technology is used, the content consumption device renders the 3D image in the window based on the current viewpoint. The viewpoint refers to the user's viewing position point, the parallax refers to a difference in lines of sight produced by the user's two eyes or a difference in lines of sight caused by motion, and the window refers to a viewing region.

The immersive media system described supports a data box. The data box refers to a data block or object including metadata. That is, the data box includes metadata of corresponding media content. As can be seen from the data processing process of the immersive media, after the immersive media are decoded, the decoded immersive media may be encapsulated and transmitted to the user. In the embodiments of the present disclosure, the immersive media refer to free-view video. In certain designs, only camera parameters can be acquired from the atlas information during the production of the free-view video, and a large-scale atlas information data box can be used to indicate related parameter information when positions of the texture image and the depth image are also relatively fixed in a plane frame, to omit remaining atlas information in the atlas track.

In a specific implementation, syntax for the large-scale atlas information data box may be obtained with reference to the following code segment 1:

```
aligned(8) class V3CLargeScaleAtlasBox extends FullBox('vlsa',0,0) {
    unsigned int(8) camera_count;
        unsigned int(8) padding_size_depth;
        unsigned int(8) padding_size_texture;
        for(i=0; i<camera_count; i++){
            unsigned int(8) camera_id;
            float(32) camera_resolution_x;
            float(32) camera_resolution_y;
            unsigned int(8) depth_downsample_factor;
            unsigned int(32) texture_vetex_x;
    unsigned int(32) texture_vetex_y;
        unsigned int(32) depth_vetex_x;
        unsigned int(32) depth_vetex_y;
    unsigned int(32) camera_para_length;
    for (i=0; i<camera_para_length; i++) {
        bit(8) camera_parameter;
}
}
}
}
```

The syntax shown in the code segment 1 has the following semantics: camera_count denotes a quantity of all cameras capturing the immersive media; padding_size_depth denotes a guard band width used to encode the depth image; padding_size_texture denotes a guard band width used to encode the texture image; camera_id denotes a camera identifier of a camera in one view, camera_resolution_x denotes widths of resolution of a texture image and a depth image captured by a camera, and camera_resolution_y denotes heights of resolution of the texture image and the depth image captured by the camera; depth_downsample_factor denotes a downsample multiplication factor of the depth image, and a width and a height of actual resolution of the depth image is ½ depth_downsample_factor of a width and a height of capture resolution of the camera; depth_vetex_x denotes a quadrature-axis component of an offset of an upper left vertex of the depth image from an origin of a plane frame (an upper left vertex of the plane frame), and depth_vetex_y denotes a direct-axis component of the offset of the upper left vertex of the depth image from the origin of the plane frame; texture_vetex_x denotes a quadrature-axis component of an offset of an upper left vertex of the texture image from the origin of the plane frame, and texture_vetex_y denotes a direct-axis component of the offset of the upper left vertex of the texture image from the origin of the plane frame; camera_para_length denotes a length (in bytes) of a camera parameter desired for volumetric video reconstruction; and camera_parameter denotes a camera parameter desired for volumetric video reconstruction.

As can be seen from the syntax of the large-scale atlas information data box, the large-scale atlas information data box indicates layout information of a texture image and a depth image in the free-view video and gives related camera parameters such as camera_resolution_y and camera_resolution_x, but only considers a scene in which the free-view video is encapsulated in a single track and does not consider a scene in which the free-view video is encapsulated in a multi-track. Moreover, the large-scale atlas information data box indicates the layout information of the texture image and the depth image in the free-view video and the related camera parameters, but only considers the scene in which the free-view video is encapsulated in a single track and does not consider a scene of multi-track encapsulation. In addition, the camera parameters indicated in the large-scale atlas information data box cannot be used as a basis for the content consumption device to select images from different views for decoding and consumption. That is, according to the camera parameters recorded in the large-scale atlas information data box, the content consumption device cannot know which image is appropriate for current user position information, making it difficult for the content consumption device to decode.

Based on this, an embodiment of the present disclosure provides a data processing scheme for immersive media. In the data processing scheme, the immersive media are encapsulated into M tracks, the immersive media are formed by images taken by N cameras from different views, and the M tracks belong to a same track group, which realizes a scene of encapsulating immersive video into a plurality of tracks. In addition, the content production device generates a free-view information data box for each track, and indicates view information corresponding to an $i^{th}$ track through the free-view information data box corresponding to the $i^{th}$ track, for example, a specific view position of the camera, and when the content consumption device decodes and displays the images in the track according to the view information corresponding to the $i^{th}$ track, decoded and displayed video can be ensured to better match a position of a user, which improves a presentation effect of the immersive video.

Figure 4:
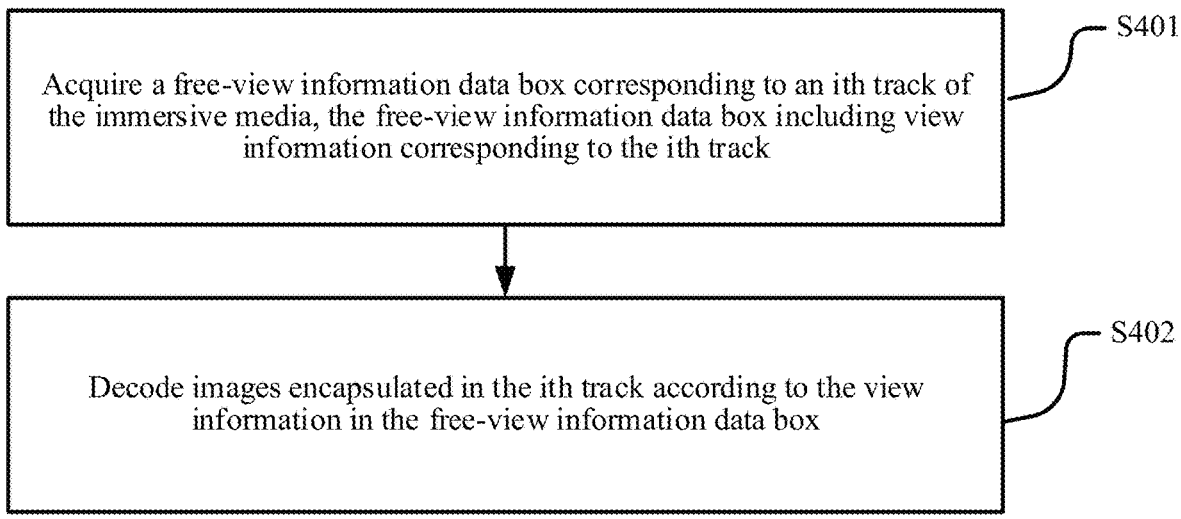
FIG. 4 is a schematic flowchart of a data processing method for immersive media according to certain embodiment(s) of the present disclosure.

Based on the descriptions, an embodiment of the present disclosure provides a data processing method for immersive media. Refer to FIG. 4 which is a schematic flowchart of a data processing method for immersive media according to an embodiment of the present disclosure. The data processing method shown in FIG. 4 may be performed by a content consumption device, and may be performed by a processor of the content consumption device. The data processing method shown in FIG. 4 may include the following steps:

S401: Acquire a free-view information data box corresponding to an $i^{th}$ track of the immersive media, the free-view information data box including view information corresponding to the $i^{th}$ track.

The immersive media are formed by images taken by N cameras from different views, the immersive media are encapsulated into M tracks, images from at least one camera are encapsulated in one track, and the M tracks belong to a same track group. The $i^{th}$ track refers to the one selected from the M tracks. How to select the $i^{th}$ track from the M tracks is introduced later.

The M tracks into which the immersive media are encapsulated are correlated through free-view track group information encapsulated in each track. Taking the $i^{th}$ track as an example below, free-view track group information corresponding to the $i^{th}$ track is encapsulated in the $i^{th}$ track, and the free-view track group information is used for indicating that the $i^{th}$ track and other tracks in which the immersive media are encapsulated belong to a same track group. The $i^{th}$ track in which the free-view track group information is encapsulated may be obtained by extending a track group data box. Syntax of the free-view track group information encapsulated in the $i^{th}$ track may be expressed as the following code segment 2:

In the code segment 2, the free-view track group information is obtained by extending the track group data box, which is identified by the "a3fg" track group type. Among all tracks including a TrackGroupTypeBox (track group data box) of an "afvg" type, the tracks with a same group ID belong to a same track group.

In the code segment 2, assuming that images captured by k of the N cameras are encapsulated in the $i^{th}$ track, the image captured by any camera may be at least one of a texture image and a depth image. In the code segment 2, the syntax of the free-view track group information may mean the following: camera_count denotes a quantity of cameras that the texture images or the depth images included in the $i^{th}$ track are from. For example, camera_count=k indicates that texture images and/or depth images from k cameras are encapsulated in the $i^{th}$ track. One camera corresponds to one piece of identification information, and each piece of identification information is stored in a first camera identification field camera_id of the free-view track group information. It is to be understood that one camera corresponds to one piece of identification information, and k cameras are included in the $i^{th}$ track, so the free-view track group information includes k first camera identification fields camera_id.

The free-view track group information further includes an image type field depth_texture_type. The image type field is used for indicating an image type to which an image captured by a $j^{th}$ camera belongs, where j is greater than 0 and less than k. In other words, an image type field depth_texture_type is used for indicating that, in an image type to which an image captured by a camera belongs, since the texture images or the depth images in the $i^{th}$ track are from k cameras, the free-view track group information includes k image type fields.

The image type field depth_texture_type indicating the image type to which the image captured by the $j^{th}$ camera belongs may be obtained with reference to the following Table 1:

TABLE 1

| depth_texture_type | Meaning |
| --- | --- |
| 0 | Reserve |
| 1 | Indicate including a texture image captured by a corresponding camera |
| 2 | Indicate including a depth image captured by the corresponding camera |
| 3 | Indicate including the texture image and the depth image captured by the corresponding camera |

In certain embodiment(s), when the image type field depth_texture_type is 1, it indicates that the image type to which the image captured by the $j^{th}$ camera belongs is the texture image. When the image type field depth_texture_type is 2, it indicates that the image type to which the image

```
aligned(8) class AvsFreeViewGroupBox extends TrackGroupTypeBox('afvg') {
  // track_group_id is inherited from TrackGroupTypeBox;
  unsigned int(8) camera_count;
    for(i=0; i<camera_count; i++){
      unsigned int(32) camera_id;
  unsigned int(2) depth_texture_type;
  bit(6) reserved;
  }
}
``` captured by the j$^{th}$ camera belongs is the depth image. When the image type field depth_texture_type is 3, it indicates that the image type to which the image captured by the j$^{th}$ camera belongs is the texture image and the depth image.

As can be seen from S401, the free-view information data box AvsFreeViewInfoBox corresponding to the i$^{th}$ track includes view information corresponding to the i$^{th}$ track. Refer to the following code segment 3 which is syntactic representation of the free-view information data box corresponding to the i$^{th}$ track. The free-view information data box corresponding to the i$^{th}$ track and the view information included in the free-view information data box are introduced below in conjunction with the code segment 3. The code segment 3 is as follows:

```
aligned(8) class AvsFreeViewInfoBox extends FullBox('afvi'){
unsigned int(8) stitching_layout;
unsigned int(8) texture_padding_size;
unsigned int(8) depth_padding_size;
unsigned int(8) camera_model;
unsigned int(8) camera_count;
    for(i=0; i<camera_count; i++){
        unsigned int(32) camera_id;
    signed int(32) camera_pos_x;
    signed int(32) camera_pos_y;
    signed int(32) camera_pos_z;
    signed int(32) camera_focal_length_x;
    signed int(32) camera_focal_length_y;
    unsigned int(32) camera_resolution_x;
    unsigned int(32) camera_resolution_y;
    unsigned int(8) depth_downsample_factor;
    unsigned int(32) texture_vetex_x;
    unsigned int(32) texture_vetex_y;
    unsigned int(32) depth_vetex_x;
    unsigned int(32) depth_vetex_y;
    ExtendedParaStruct( );
    }
}
aligned(8) class ExtendedParaStruct t( ) {
unsigned int(8) para_num;
for(i=0; i<para_num; i++){
    unsigned int(8) para_type;
unsigned int(16) para_length;
    for (i=0; i<para_length; i++) {
        bit(8) camera_parameter;
    }
    }
}
```

① The view information corresponding to the i$^{th}$ track may include a video stitching layout indication fieldstitching_layout. The video stitching layout indication field is used for indicating whether the texture image and the depth image included in the i$^{th}$ track are encoded by stitching. In certain embodiment(s), when or in response to a determination that the video stitching layout indication field stitching_layout is a first value, it indicates that the texture image and the depth image included in the i$^{th}$ track are encoded by stitching. When or in response to a determination that the video stitching layout indication field stitching_layout is a second value, it indicates that the texture image and the depth image included in the i$^{th}$ track are separately encoded. For example, assuming that the immersive media refers to 6DoF video, the first value is 0, and the second value 1, the video stitching layout indication field stitching_layout in the i$^{th}$ track may be shown in the following Table 2:

TABLE 2

| stitching_layout | 6DoF video stitching layout |
| --- | --- |
| 0 | Encode the depth image and the texture image by stitching |

TABLE 2-continued

| stitching_layout | 6DoF video stitching layout |
| --- | --- |
| 1 | Separately encode the depth image and the texture image |
| Others | Reserved |

② The view information corresponding to the i$^{th}$ track further includes a camera model field camera_model. The field is used for indicating camera models of the k cameras in the i$^{th}$ track. As can be seen from the descriptions, k denotes a quantity of cameras from which the depth images and/or the texture images in the i$^{th}$ track are from. The view information corresponding to the i$^{th}$ track may further include a camera quantity field camera_count. The camera quantity field is used for storing the quantity of cameras from which the depth images and/or the texture images in the i$^{th}$ track are from, which is assumed to be k.

In certain embodiment(s), when or in response to a determination that the camera model field camera_model is a third value, it indicates that a camera model to which the j$^{th}$ camera belongs is a first model. When or in response to a determination that the camera model field camera_model is a fourth value, it indicates that the camera model to which the j$^{th}$ camera belongs is a second model. The first model may refer to a pinhole model, and the second model may refer to a fisheye model. Assuming that the third value is 0, the fourth value is 1, and the immersive media are 6DoF video, the camera model field camera_model in the view information corresponding to the i$^{th}$ track may be shown in the following Table 3:

TABLE 3

| Camera model | 6DoF video camera model |
| --- | --- |
| 0 | Pinhole model |
| 1 | Fisheye model |
| Other | Reserved |

③ The view information corresponding to the i$^{th}$ track further includes a guard band width field of the texture image texture_padding_size, and a guard band width field of the depth image depth_padding_size. The guard band width field of the texture image is used for storing a guard band width used to encode the texture image in the i$^{th}$ track. The guard band width field of the depth image is used for storing a guard band width used to encode the depth image in the i$^{th}$ track.

④ The view information corresponding to the i$^{th}$ track further includes a second camera identification field camera_id. The second camera identification field camera_id is used for storing identification information of the j$^{th}$ camera in the i$^{th}$ track. As can be seen from the descriptions, the texture images and the depth images included in the i$^{th}$ track are from the k cameras. j is greater than or equal to 0 and less than k. In other words, one second camera identification field camera_id stores identification information of any of the k cameras. Therefore, k camera identification fields are desired to store the identification information of the k cameras. The second camera identification field camera_id herein has a same function as the first camera identification field camera_id in the free-view track group information, both of which are used for storing the identification information of the j$^{th}$ camera in the i$^{th}$ track.

⑤ The view information corresponding to the i$^{th}$ track further includes a camera attribute information field. The camera attribute information field is used for storing camera attribute information of the j$^{th}$ camera. The camera attribute information of the j$^{th}$ camera may include a quadrature-axis component value, a direct-axis component value, and a vertical-axis component value of a position of the j$^{th}$ camera, a quadrature-axis component value and a direct-axis component value of a focal length of the j$^{th}$ camera, and a width and a height of resolution of the image captured by the j$^{th}$ camera. Therefore, the camera attribute information field may include: 1) a camera position quadrature-axis component field camera_pos_x used for storing a quadrature-axis component value (also called an x-component value) of the position of the j$^{th}$ camera; 2) a camera position direct-axis component field camera_pos_y used for storing a direct-axis component value (also called a y-component value) of the position of the j$^{th}$ camera; 3) a camera position vertical-axis component field camera_pos_z used for storing a vertical-axis component value (also called a z-component value) of the position of the j$^{th}$ camera; 4) a camera focal length quadrature-axis component field focal_length_x used for storing a quadrature-axis component value (also called an x-component value) of the focal length of the j$^{th}$ camera; 5) a camera focal length direct-axis component field focal_length_y used for storing a direct-axis component value (also called a y-component value) of the focal length of the j$^{th}$ camera; 6) a camera-captured image resolution width field camera_resolution_x used for storing a width of resolution of an image captured by the j$^{th}$ camera; and 7) a camera-captured image resolution width field camera_resolution_x used for storing the width of resolution of the image captured by the j$^{th}$ camera.

Since the texture images and/or the depth images in the i$^{th}$ track are from k cameras and one camera attribute information field is used for storing camera attribute information of one camera, the view information corresponding to the i$^{th}$ track includes k camera attribute information fields used for storing camera attribute information of the k cameras. Correspondingly, one camera attribute field includes the 1) to 7), and k pieces of camera attribute information include k 1) to 7).

⑥ The view information corresponding to the i$^{th}$ track further includes an image information field. The image information field is used for storing image information of the image captured by the j$^{th}$ camera. The image information may include at least one of the following: a downsample multiplication factor of the depth image, an offset of an upper left vertex of the depth image from an origin of a plane frame, and an offset of an upper left vertex of the texture image from the origin of the plane frame. Based on this, the image information field may include: 1) a depth image downsample multiplication factor field depth_downsample_factor used for storing a downsample multiplication factor of the depth image; 2) a texture image upper left vertex quadrature-axis offset field texture_vetex_x used for storing a quadrature-axis component of an offset of an upper left vertex of the texture image from an origin of a plane frame; 3) a texture image upper left vertex direct-axis offset field texture_vetex_y used for storing a direct-axis component of the offset of the upper left vertex of the texture image from the origin of the plane frame; 4) a depth image upper left vertex quadrature-axis offset field depth_vetex_x used for storing a quadrature-axis offset of an upper left vertex of the depth image from the origin of the plane frame; and 5) a depth image upper left vertex direct-axis offset field depth_vetex_y used for storing a direct-axis offset of the upper left vertex of the depth image from the origin of the plane frame.

One image information field is used for storing image information of an image captured by one camera. Depth images and/or texture images captured by k cameras are included in the i$^{th}$ track. Therefore, the view information corresponding to the i$^{th}$ track includes k image information fields.

⑦ The view information corresponding to the i$^{th}$ track further includes a custom camera parameter field camera_parameter. The custom camera parameter field is used for storing an f$^{th}$ custom camera parameter of the j$^{th}$ camera. f is an integer greater than or equal to 0 and less than h. h denotes a quantity of custom camera parameters of the j$^{th}$ camera. The quantity of the custom camera parameters of the j$^{th}$ camera may be stored in a custom camera parameter number field para_num of the view information.

Since the quantity of the custom camera parameters of the j$^{th}$ camera is h and one custom camera parameter field is used for storing one custom camera parameter, a quantity of custom camera parameter fields corresponding to the j$^{th}$ camera may be h. Besides, since each camera corresponds to h custom camera parameters and k cameras are included in the i$^{th}$ track, the view information corresponding to the i$^{th}$ track includes k*h custom camera parameter fields.

⑧ The view information corresponding to the i$^{th}$ track further includes a custom camera parameter type field para_type. The custom camera parameter type field para_type is used for storing a type to which the f$^{th}$ custom camera parameter of the j$^{th}$ camera belongs. A type to which one custom camera parameter of the j$^{th}$ camera belongs is stored in one custom camera parameter type field. Since the j$^{th}$ camera corresponds to h custom camera parameters, a quantity of the custom camera parameter type field is h. Similar to ⑦, the view information corresponding to the i$^{th}$ track includes k*h custom camera parameter type fields.

⑨ The view information corresponding to the i$^{th}$ track further includes a custom camera parameter length field para_length. The custom camera parameter length field para_length is used for storing a length of the f$^{th}$ custom camera parameter of the j$^{th}$ camera. Since a length of one custom camera parameter of the j$^{th}$ camera is stored in one custom camera parameter length field and the j$^{th}$ camera corresponds to h custom camera parameters, a quantity of the custom camera parameter length field is h.

In this embodiment of the present disclosure, the free-view information data box corresponding to the i$^{th}$ track acquired in S401 is realized according to a signaling description file transmitted by the content production device. In certain embodiment(s), before S401 is performed, a signaling description file corresponding to the immersive media is acquired. The signaling description file includes a free-view camera descriptor corresponding to the immersive media. The free-view camera descriptor is used for recording camera attribute information corresponding to a video clip in each track. The video clip in the track is formed by the texture image and/or the depth image in the track. The free-view camera descriptor is encapsulated in an adaptation set level of a media presentation description file of the immersive media, or the signaling description file is encapsulated in a representation level of the media presentation description file.

In this embodiment of the present disclosure, the free-view camera descriptor may be expressed as AvsFreeViewCamInfo, which is a SupplementalProperty element, with an @schemeIdUri attribute of "urn:ays:ims:

2018:av31". The free-view camera descriptor, when located in the representation level, may be used for describing camera attribute information corresponding to a video clip in a track corresponding to the representation level. The free-view camera descriptor, when located in the adaptation set level, may be used for describing camera attribute information corresponding to video clips in a plurality of tracks in the adaptation set level.

Elements and attributes in the free-view camera descriptor may be shown in the following Table 4:

TABLE 4

| Elements and Attributes for AvsFreeViewCamInfo descriptor | Function | Data type | Explanation |
|---|---|---|---|
| AvsFreeViewCam | 0 ... N | avs:ims:2018:av31 | If the free-view camera descriptor exists in the representation level, the element is used for indicating camera attributes corresponding to images in a track corresponding to the representation level. If the free-view camera descriptor exists in the adaptation set level, the element is used for indicating attribute information of cameras corresponding to images in a plurality of tracks in the adaptation set level. |
| AvsFreeViewCam @cameraId | M | xs:unsignedInt | Identification information corresponding to each track is indicated. The identification information corresponds to identification information in the AvsFreeViewInfoBox of the track. |
| AvsFreeViewCam@ camera_pos_x | M | xs:float | An x-component value of the position of the camera is indicated. |
| AvsFreeViewCam@ camera_pos_y | M | xs:float | A y-component value of the position of the camera is indicated. |
| AvsFreeViewCam@ camera_pos_z | M | xs:float | A z-component value of the position of the camera is indicated. |
| AvsFreeViewCam@ focal_length_x | M | xs:float | An x-component value of the focal length of the camera is indicated. |
| AvsFreeViewCam@ focal_length_y | M | xs:float | A y-component value of the focal length of the camera is indicated. |

Further, the content consumption device acquires the free-view information data box corresponding to the $i^{th}$ track based on the signaling description file. In an embodiment, the acquiring a free-view information data box corresponding to an $i^{th}$ track includes: selecting, based on the camera attribute information corresponding to the images in each track recorded in the free-view camera descriptor, a candidate camera matching position information of a user from the N cameras; transmitting a first resource request for acquiring an image captured by the candidate camera to a content production device, the first resource request being used for instructing the content production device to select, according to the view information in the free-view information data box corresponding to each of the M tracks, the $i^{th}$ track from the M tracks and return the free-view information data box corresponding to the $i^{th}$ track, the image captured by the candidate camera being encapsulated in the $i^{th}$ track; and receiving the free-view information data box corresponding to the $i^{th}$ track returned by the content production device. In this way, the content consumption device may only acquire the free-view information data box corresponding to a desired track and does not need to acquire the free-view information data boxes corresponding to all the tracks, which can save transmission resources. Examples are provided below:

(1) It is assumed that the content production device generates free-view video and encapsulates the free-view video into a plurality of tracks. Each track may include a texture image and a depth image from one view. That is, a texture image and a depth image from one camera are encapsulated in one track. The texture image and the depth image in one track form a video clip. In this way, it may be understood that a video clip from a camera in one view is encapsulated in one track. It is assumed that the free-view video is encapsulated into 3 tracks, and the texture image and the depth image of the video in each track form a video clip. Therefore, the free-view video includes 3 video clips, which are respectively expressed as Representation1, Representation2, and Representation3.

(2) The content production device generates, in a signaling generation link, a signaling description file corresponding to the free-view video according to the view information in the free-view information data box corresponding to each track. The signaling description file may carry a free-view camera descriptor. It is assumed that the free-view camera descriptor of the free-view video records camera attribute information corresponding to the 3 video clips as follows:

Representation1: {Camera11: ID=1;Pos=(100,0,100);Focal=(10,20)};
Representation2: {Camera12: ID=2;Pos=(100,100,100); Focal=(10,20)};
Representation 1: {Camera13: ID=3;Pos=(0,0,100);Focal=(10,20)};

(3) The content production device transmits the signaling description file to the content consumption device.

(4) The content consumption device selects, according to the signaling description file and a user bandwidth and based on the user's position information and the camera attribute information in the signaling description file, video clips from Camera12 and Camera13 and transmits a request to the content production device.

(5) The content production device transmits the free-view information data box of tracks of the video clips from Camera12 and Camera13 to the content consumption device. The content consumption device initializes a decoder according to the acquired free-view information data boxes corresponding to the tracks to decode and consume the corresponding video clips.

In another embodiment, the acquiring a free-view information data box corresponding to an $i^{th}$ track includes: transmitting a second resource request to a content production device based on the signaling description file and a user bandwidth, the second resource request being used for instructing the content production device to return M free-view information data boxes of the M tracks, one track corresponding to one free-view information data box; and acquiring, according to the view information in the free-view information data box corresponding to each track and position information of a user, the free-view information data box corresponding to the $i^{th}$ track from the M free-view information data boxes. In this way, the content consumption device acquires the free-view information data boxes of all the tracks, but does not decode and consume all the images in the tracks and only decodes the images in the $i^{th}$ track matching the user's current position, which saves decoding resources. An example is provided below:

(1) It is assumed that the content production device generates free-view video and encapsulates the free-view video into a plurality of tracks. Each track may include a texture image and a depth image from one view. That is, a video clip from a camera in one view is encapsulated in each track. It is assumed that video clips of the free-view video encapsulated into 3 tracks are respectively expressed as Representation1, Representation2, and Representation3.

(2) The content production device generates a signaling description file of the free-view video according to view information corresponding to each track, as shown below:

Representation1: {Camera11: ID=1;Pos=(100,0,100);Focal=(10,20)};
Representation2: {Camera12: ID=2;Pos=(100,100,100); Focal=(10,20)};
Representation1: {Camera13: ID=3;Pos=(0,0,100);Focal=(10,20)};

(3) The content production device transmits the signaling description file in (2) to the content consumption device.

(4) The content consumption device requests free-view information data boxes corresponding to all the tracks from the content production device according to the signaling description file and a user bandwidth. It is assumed that the free-view video is encapsulated into 3 tracks, which are respectively Track1, Track2, and Track3. Camera attribute information corresponding to the video clip encapsulated in each track may be as follows:

Track1: {Camera1: ID=1; Pos=(100,0,100);Focal=(10, 20)};
Track2: {Camera2: ID=2; Pos=(100,100,100);Focal=(10, 20)};
Track3: {Camera3: ID=3; Pos=(0,0,100);Focal=(10,20)};

(5) The content consumption device selects, according to acquired view information in the free-view information data boxes corresponding to all the tracks and the user's current viewing position information, the video clips encapsulated in track2 and track3 for decoding and consumption.

S402: Decode images encapsulated in the $i^{th}$ track according to the view information in the free-view information data box.

In a specific implementation, the decoding images encapsulated in the $i^{th}$ track according to the view information in the free-view information data box may include: initializing a decoder according to the view information corresponding to the $i^{th}$ track; and decoding the images encapsulated in the $i^{th}$ track according to coding related indication information in the view information.

In the embodiments of the present disclosure, immersive media are encapsulated into M tracks, the immersive media are formed by images taken by N cameras from different views, one track may include images from at least one camera, and the M tracks belong to a same track group, which realizes a scene of encapsulating an immersive video into a plurality of tracks. In addition, the content production device generates a free-view information data box for each track, and indicates view information corresponding to an $i^{th}$ track through the free-view information data box corresponding to the $i^{th}$ track, for example, a specific view position of the camera, and when the content consumption device decodes and displays the images in the track according to the view information corresponding to the $i^{th}$ track, decoded and displayed video can be ensured to better match a position of a user, which improves a presentation effect of the immersive video.

Figure 5:
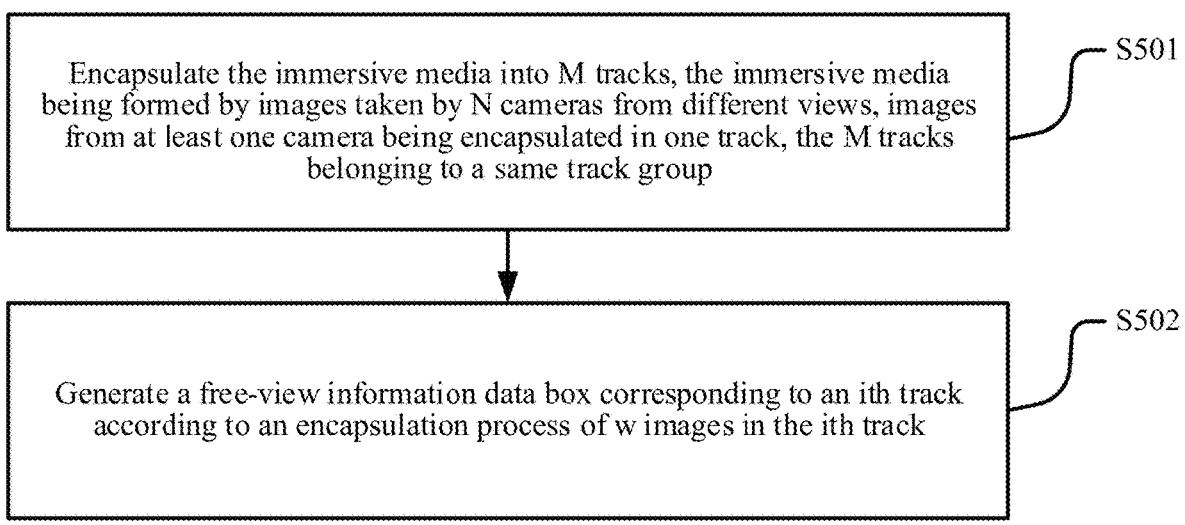
FIG. 5 is a schematic flowchart of another data processing method for immersive media according to certain embodiment(s) of the present disclosure.

Based on the data processing method for immersive media, an embodiment of the present disclosure provides another data processing method for immersive media. Refer to FIG. 5 which is a schematic flowchart of a data processing method for immersive media according to an embodiment of the present disclosure. The data processing method for immersive media shown in FIG. 5 may be performed by a content production device, and may be performed by a processor of the content production device. The data processing method for immersive media shown in FIG. 5 may include the following steps:

S501: Encapsulate the immersive media into M tracks, the immersive media being formed by images taken by N cameras from different views, images from at least one camera being encapsulated in one track, the M tracks belonging to a same track group.

S502: Generate a free-view information data box corresponding to an $i^{th}$ track according to an encapsulation process of w images in the $i^{th}$ track.

w is an integer greater than or equal to 1. The w images are encapsulated in the $i^{th}$ track. The w images may be at least one of depth images and texture images taken by a camera from one or more views. The generating a free-view information data box corresponding to an $i^{th}$ track according to an encapsulation process of w images in the $i^{th}$ track is introduced in conjunction with the code segment 3 in the embodiment of FIG. 4, which may include the following steps:

① The free-view information data box corresponding to the $i^{th}$ track includes free-view track group information. The free-view track group information may indicate that the $i^{th}$ track and other tracks in which the immersive media are encapsulated belong to a same track group. The free-view track group information includes a first camera identification field camera_id and an image type field depth_texture_type, and the generating a free-view information data box corresponding to an $i^{th}$ track according to an encapsulation process of w images in the $i^{th}$ track in S502 includes: determining that the w images are from k cameras, k being an integer greater than 1; storing identification information of a $j^{th}$ camera in the k cameras in the first camera identification field camera_id, j being greater than 0 and less than k; and determining the image type field depth_texture_type according to an image type to which an image captured by the $j^{th}$ camera belongs, the image type including any one or more of depth images and texture images. It is to be understood that identification information of one camera is stored in one first camera identification field camera_id. If the images included in the $i^{th}$ track are from k cameras, the free-view track group information may include k first camera identification fields camera_id. Similarly, the free-view track group includes k image type fields depth_texture_type.

In certain embodiment(s), the determining the image type field according to an image type to which an image captured by the $j^{th}$ camera belongs includes: setting the image type field to a second value when the image type to which the image captured by the $j^{th}$ camera belongs is the texture image; setting the image type field to a third value when the image type to which the image captured by the $j^{th}$ camera belongs is the depth image; and setting the image type field to a fourth value when the image type to which the image captured by the $j^{th}$ camera belongs is the texture image and the depth image. The second value may be 1, the third value may be 2, the fourth value may be 3, and the image type field may be shown in Table 2 in the embodiment of FIG. 4.

② The free-view information corresponding to the $i^{th}$ track includes a video stitching layout indication field stitching_layout, and the generating a free-view information data box corresponding to an $i^{th}$ track according to an encapsulation process of w images in the $i^{th}$ track in S502 includes: setting the video stitching layout indication field stitching_layout to a first value when or in response to a determination that the texture image and the depth image included in the $i^{th}$ track are encoded by stitching; and setting the video stitching layout indication field stitching_layout to a second value when or in response to a determination that the texture image and the depth image included in the $i^{th}$ track are separately encoded. The first value may be 0, the second value may be 1, and the video stitching layout indication field may be shown in Table 3 in the embodiment of FIG. 4.

③ The view information corresponding to the $i^{th}$ track further includes a camera model field camera_model. The generating a free-view information data box corresponding to an $i^{th}$ track according to an encapsulation process of w images in the $i^{th}$ track in S502 includes: setting the camera model field camera_model to the first value when or in response to a determination that a camera model to which a camera capturing the w images belongs is a first model; and setting the camera model field camera_model to the second value when or in response to a determination that the camera model to which the camera capturing the w images belongs is a second model. As described above, the first value may be 0, the second value may be 1, and the camera model field may be shown in Table 4 in the embodiment of FIG. 4.

④ The view information corresponding to the $i^{th}$ track further includes a guard band width field of the texture image texture_padding_size, and a guard band width field of the depth image depth_padding_size. The generating a free-view information data box corresponding to an $i^{th}$ track according to an encapsulation process of w images in the $i^{th}$ track in S502 includes: acquiring a guard band width of the texture image used to encode the texture image in the $i^{th}$ track, and storing the guard band width of the texture image in the guard band width field of the texture image texture_padding_size; and acquiring a guard band width of the depth image used to encode the depth image in the $i^{th}$ track, and storing the guard band width of the depth image in the guard band width field of the depth image depth_padding_size.

⑤ The free-view information corresponding to the $i^{th}$ track further includes a second camera identification field camera_id and a camera attribute information field, and the generating a free-view information data box corresponding to an $i^{th}$ track according to an encapsulation process of w images in the $i^{th}$ track in S502 includes: storing identification information of a $j^{th}$ camera in the second camera identification field camera_id, j being greater than or equal to 0 and less than k, k denoting a quantity of cameras that the w images are from; and acquiring camera attribute information of the $j^{th}$ camera, and storing the acquired camera attribute information in the camera attribute information field. The camera attribute information of the $j^{th}$ camera includes any one or more of the following: a quadrature-axis component value, a direct-axis component value, and a vertical-axis component value of a position of the $j^{th}$ camera, a quadrature-axis component value and a direct-axis component value of a focal length of the $j^{th}$ camera, and a width and a height of resolution of the image captured by the $j^{th}$ camera.

Based on this, the camera attribute information field may include: 1) a camera position quadrature-axis component field camera_pos_x used for storing a quadrature-axis component value (also called an x-component value) of the position of the $j^{th}$ camera; 2) a camera position direct-axis component field camera_pos_y used for storing a direct-axis component value (also called a y-component value) of the position of the $j^{th}$ camera; 3) a camera position vertical-axis component field camera_pos_z used for storing a vertical-axis component value (also called a z-component value) of the position of the $j^{th}$ camera; 4) a camera focal length quadrature-axis component field focal_length_x used for storing a quadrature-axis component value (also called an x-component value) of the focal length of the $j^{th}$ camera; 5) a camera focal length direct-axis component field focal_length_y used for storing a direct-axis component value (also called a y-component value) of the focal length of the $i^{th}$ camera; 6) a camera-captured image resolution width field camera_resolution_x used for storing a width of resolution of an image captured by the $j^{th}$ camera; and 7) a camera-captured image resolution width field camera_resolution_x used for storing the width of resolution of the image captured by the $j^{th}$ camera.

Since the texture images and/or the depth images in the $i^{th}$ track are from k cameras and one camera attribute information field is used for storing camera attribute information of one camera, the view information corresponding to the $i^{th}$ track includes k camera attribute information fields used for storing camera attribute information of the k cameras. Correspondingly, one camera attribute field includes the 1) to 7), and k pieces of camera attribute information include k 1) to 7).

⑥ The free-view information corresponding to the $i^{th}$ track further includes an image information field, and the generating a free-view information data box corresponding to an $i^{th}$ track according to an encapsulation process of w images in the $i^{th}$ track in S502 includes: acquiring image information of the image captured by the $j^{th}$ camera, and storing the acquired image information in the image information field. The image information includes one or more of the following: a downsample multiplication factor of the depth image, an offset of an upper left vertex of the depth image from an origin of a plane frame, and an offset of an upper left vertex of the texture image from the origin of the plane frame.

Based on this, the image information field may include: 1) a depth image downsample multiplication factor field depth_downsample_factor used for storing a downsample multiplication factor of the depth image; 2) a texture image upper left vertex quadrature-axis offset field texture_vetex_x used for storing a quadrature-axis component of an offset of an upper left vertex of the texture image from an origin of a plane frame; 3) a texture image upper left vertex direct-axis offset field texture_vetex_y used for storing a direct-axis component of the offset of the upper left vertex of the texture image from the origin of the plane frame; 4) a depth image upper left vertex quadrature-axis offset field depth_vetex_x used for storing a quadrature-axis offset of an upper left vertex of the depth image from the origin of the plane frame; and 5) a depth image upper left vertex direct-axis offset field depth_vetex_y used for storing a direct-axis offset of the upper left vertex of the depth image from the origin of the plane frame.

One image information field is used for storing image information of an image captured by one camera. Depth images and/or texture images captured by k cameras are included in the $i^{th}$ track. Therefore, free-view information corresponding to the $i^{th}$ track includes k image information fields.

⑦ The view information corresponding to the $i^{th}$ track further includes a custom camera parameter field, a custom camera parameter type field, and a custom camera parameter length field. The generating a free-view information data box corresponding to an $i^{th}$ track according to an encapsulation process of w images in the $i^{th}$ track includes: acquiring an $f^{th}$ custom camera parameter, and storing the $f^{th}$ custom camera parameter in the custom camera parameter field, f being an integer greater than or equal to 0 and less than h, h denoting a quantity of custom camera parameters of the $j^{th}$ camera; and determining a parameter type to which the $f^{th}$ custom camera parameter belongs and a length of the $f^{th}$ custom camera parameter, storing the parameter type to which the $f^{th}$ custom camera parameter belongs in the custom camera parameter type field, and storing the length of the $f^{th}$ custom camera parameter in the custom camera parameter length field.

Since the quantity of the custom camera parameters of the $j^{th}$ camera is h and one custom camera parameter field is used for storing one custom camera parameter, a quantity of custom camera parameter fields corresponding to the $j^{th}$ camera may be h. Besides, since each camera corresponds to h custom camera parameters and k cameras are included in the $i^{th}$ track, the view information corresponding to the $i^{th}$ track includes k*h custom camera parameter fields. Since the quantity of the custom camera parameters of the $j^{th}$ camera is h and one custom camera parameter field is used for storing one custom camera parameter, a quantity of custom camera parameter fields corresponding to the $j^{th}$ camera may be h. Besides, since each camera corresponds to h custom camera parameters and k cameras are included in the $i^{th}$ track, the view information corresponding to the $i^{th}$ track includes k*h custom camera parameter fields. Since a length of one custom camera parameter of the $j^{th}$ camera is stored in one custom camera parameter length field and the $j^{th}$ camera corresponds to h custom camera parameters, a quantity of the custom camera parameter length field is h.

In addition, the content production device may also generate a signaling description file according to view information in the free-view information data boxes corresponding to the M tracks. The signaling description file includes a free-view camera descriptor corresponding to the immersive media. The free-view camera descriptor is used for recording camera attribute information corresponding to the images in each track. The free-view camera descriptor is encapsulated in an adaptation set level of a media presentation description file of the immersive media, or the signaling description file is encapsulated in a representation level of the media presentation description file.

Further, the content production device may transmit the signaling description file to the content consumption device, so that the content consumption device acquires the free-view information data box corresponding to the $i^{th}$ track according to the signaling description file.

As an exemplary implementation, the content production device transmits the signaling description file to the content consumption device to instruct the content consumption device to select, based on the camera attribute information corresponding to the images in each track recorded in the free-view camera descriptor, a candidate camera matching a position of a user from the N cameras, and transmits a first resource request for acquiring images from the candidate camera; and selects in response to the first resource request, the $i^{th}$ track from the M tracks according to view information in a free-view information data box corresponding to each of the M tracks and transmits the free-view information data box corresponding to the $i^{th}$ track to the content consumption device. The $i^{th}$ track includes the images from the candidate camera.

As another exemplary implementation, the content production device transmits the signaling description file to the content consumption device to instruct the content consumption device to transmit a second resource request according to the signaling description file and a user bandwidth; and transmits M free-view information data boxes corresponding to the M tracks to the content consumption device in response to the second resource request, to instruct the content consumption device to acquire, according to view information in a free-view information data box corresponding to each track and position information of a user, the free-view information data box corresponding to the track from the M free-view information data boxes.

In the embodiments of the present disclosure, immersive media are encapsulated into M tracks, the immersive media are formed by images taken by cameras from different views, the M tracks belong to a same track group, images from at least one camera are encapsulated in one track, which realizes a scene of encapsulating an immersive video into a plurality of tracks. In addition, the content production device generates a free-view information data box for each track according to the encapsulation process of the images in each track, and indicates view information corresponding to an $i^{th}$ track through the free-view information data box corresponding to the $i^{th}$ track, for example, a specific view position of the camera, and when the content consumption device decodes and displays the images in the track according to the view information corresponding to the $i^{th}$ track, decoded and displayed video can be ensured to better match a position of a user, which improves a presentation effect of the immersive video.

Figure 6:
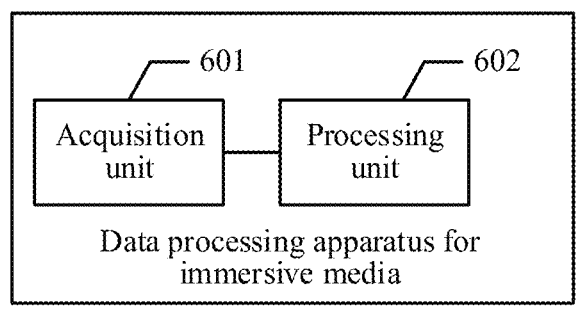
FIG. 6 is a schematic structural diagram of a data processing apparatus for immersive media according to certain embodiment(s) of the present disclosure.

Based on the embodiment of the data processing method for immersive media, an embodiment of the present disclosure provides a data processing apparatus for immersive media. The data processing apparatus for immersive media may be a computer program (including program code) running in a content consumption device. For example, the data processing apparatus for immersive media may be application software in the content consumption device. Refer to FIG. 6 which is a schematic structural diagram of a data processing apparatus for immersive media according to an embodiment of the present disclosure. The data processing apparatus shown in FIG. 6 can operate the following units: an acquisition unit 601 configured to acquire a free-view information data box corresponding to an $i^{th}$ track of the immersive media, the free-view information data box including view information corresponding to the $i^{th}$ track, i being an integer greater than or equal to 1 and less than or equal to M; and the immersive media being formed by images taken by N cameras from different views, the immersive media being encapsulated into M tracks, images from at least one camera being encapsulated in one track, the M tracks belonging to a same track group, N and M being integers greater than 1; a processing unit 602 configured to decode images encapsulated in the $i^{th}$ track according to the view information in the free-view information data box.

In an embodiment, images from k of the N cameras are encapsulated in the $i^{th}$ track, k being an integer greater than 0; free-view track group information corresponding to the $i^{th}$ track is further encapsulated in the $i^{th}$ track, the free-view track group information being used for indicating that the $i^{th}$ track and other tracks in which the immersive media are encapsulated belong to a same track group; the free-view track group information including a first camera identification field and an image type field; the first camera identification field being used for storing identification information of a $j^{th}$ camera in the k cameras, the image type field being used for indicating an image type to which an image captured by the $j^{th}$ camera belongs, the image type including at least one of a texture image and a depth image.

In an embodiment, when or in response to a determination that the $i^{th}$ track includes the texture image and the depth image, the view information corresponding to the $i^{th}$ track includes a video stitching layout indication field; when or in response to a determination that the video stitching layout indication field is a first value, it indicates that the texture image and the depth image included in the $i^{th}$ track are encoded by stitching; and when or in response to a determination that the video stitching layout indication field is a second value, it indicates that the texture image and the depth image included in the $i^{th}$ track are separately encoded.

In an embodiment, the view information corresponding to the $i^{th}$ track further includes a camera model field; when or in response to a determination that the camera model field is a third value, it indicates that a camera model to which the $j^{th}$ camera belongs is a first model; and when or in response to a determination that the camera model field is a fourth value, it indicates that the camera model to which the $j^{th}$ camera belongs is a second model.

In an embodiment, the view information corresponding to the $i^{th}$ track further includes a guard band width field of the texture image and a guard band width field of the depth image, the guard band width field of the texture image being used for storing a guard band width used to encode the texture image in the $i^{th}$ track, the guard band width field of the depth image being used for storing a guard band width used to encode the depth image in the $i^{th}$ track.

In an embodiment, the view information corresponding to the $i^{th}$ track further includes a second camera identification field and a camera attribute information field; the second camera identification field being used for storing identification information of the $j^{th}$ camera; the camera attribute information field being used for storing camera attribute information of the $j^{th}$ camera, the camera attribute information of the $j^{th}$ camera including at least one of the following: a quadrature-axis component value, a direct-axis component value, and a vertical-axis component value of a position of the $j^{th}$ camera, a quadrature-axis component value and a direct-axis component value of a focal length of the $j^{th}$ camera, and a width and a height of resolution of the image captured by the $j^{th}$ camera.

In an embodiment, the view information corresponding to the $i^{th}$ track further includes an image information field, the image information field being used for storing image information of the image captured by the $j^{th}$ camera, the image information including at least one of the following: a downsample multiplication factor of the depth image, an offset of an upper left vertex of the depth image from an origin of a plane frame, and an offset of an upper left vertex of the texture image from the origin of the plane frame.

In an embodiment, the view information corresponding to the $i^{th}$ track further includes a custom camera parameter field, a custom camera parameter type field, and a custom camera parameter length field; the custom camera parameter field being used for storing an $f^{th}$ custom camera parameter of the $j^{th}$ camera, f being an integer greater than or equal to 0 and less than h, h denoting a quantity of custom camera parameters of the $j^{th}$ camera; the custom camera parameter type field being used for storing a parameter type to which the $f^{th}$ custom camera parameter belongs; the custom camera parameter length field being used for storing a length of the $f^{th}$ custom camera parameter.

In an embodiment, the acquisition unit 601 is further configured to: acquire a signaling description file corresponding to the immersive media, the signaling description file including a free-view camera descriptor corresponding to the immersive media, the free-view camera descriptor being used for recording camera attribute information corresponding to a video clip in each track, the video clip in the track being formed by the texture image and the depth image included in the track; the free-view camera descriptor being encapsulated in an adaptation set level of a media presentation description file of the immersive media, or the signaling description file being encapsulated in a representation level of the media presentation description file.

In an embodiment, the acquisition unit 601, when acquiring a free-view information data box corresponding to an $i^{th}$ track of the immersive media, performs the following operations: selecting, based on the camera attribute information corresponding to the video clip in each track recorded in the free-view camera descriptor, a candidate camera matching position information of a user from the N cameras; transmitting a first resource request for acquiring segmented video from the candidate camera to a content production device, the first resource request being used for instructing the content production device to select, according to the view information in the free-view information data box corresponding to each of the M tracks, the $i^{th}$ track from the M tracks and return the free-view information data box corresponding to the $i^{th}$ track, at least one of the texture image and the depth image encapsulated in the $i^{th}$ track being from the candidate camera; and receiving the free-view information data box corresponding to the $i^{th}$ track returned by the content production device.

In an embodiment, the acquisition unit 601, when acquiring a free-view information data box corresponding to an $i^{th}$ track of the immersive media, performs the following operations: transmitting a second resource request to a content production device based on the signaling description file and a user bandwidth, the second resource request being used for instructing the content production device to return M free-view information data boxes of the M tracks, one track corresponding to one free-view information data box; and acquiring, according to the view information in the free-view information data box corresponding to each track and position information of a user, the free-view information data box corresponding to the $i^{th}$ track from the M free-view information data boxes.

According to an embodiment of the present disclosure, the steps involved in the data processing method for immersive media shown in FIG. 4 may be performed by the units in the data processing apparatus for immersive media shown in FIG. 6. For example, S401 in FIG. 4 may be performed by the acquisition unit 601 in the data processing apparatus in FIG. 6, and S402 may be performed by the processing unit 602 in the data processing apparatus in FIG. 6.

According to another embodiment of the present disclosure, units of the system for data processing apparatus for immersive media shown in FIG. 6 may be separately or wholly combined into one or several other units, or one (or more) of the units herein may further be divided into multiple units of smaller functions. In this way, same operations can be implemented, and implementation of the technical effects of the embodiments of the present disclosure is not affected. The units are divided based on logical functions. A function of one unit may also be implemented by a plurality of units, or functions of a plurality of units are implemented by one unit. In other embodiments of the present disclosure, the data processing apparatus for immersive media may also include other units. The functions may also be cooperatively implemented by other units and may be cooperatively implemented by a plurality of units.

According to another embodiment of the present disclosure, a computer program (including program code) that can perform the steps in the corresponding method shown in FIG. 4 may be run on a general computing device, such as a computer, which includes processing elements and storage elements such as a central processing unit (CPU), a random access memory (RAM), and a read-only memory (ROM), to construct the data processing apparatus for immersive media shown in FIG. 6 and implement the data processing method for immersive media in the embodiments of the present disclosure. The computer program may be recorded in, for example, a computer-readable storage medium, and may be loaded into the computing device by using the computer-readable storage medium, and run on the computing device.

In the embodiments of the present disclosure, immersive media are encapsulated into M tracks, the immersive media are formed by images taken by N cameras from different views, one track may include images from at least one camera, and the M tracks belong to a same track group, which realizes a scene of encapsulating an immersive video into a plurality of tracks. In addition, the content production device generates a free-view information data box for each track, and indicates view information corresponding to an $i^{th}$ track through the free-view information data box corresponding to the $i^{th}$ track, for example, a specific view position of the camera, and when the content consumption device decodes and displays the images in the track according to the view information corresponding to the $i^{th}$ track, decoded and displayed video can be ensured to better match a position of a user, which improves a presentation effect of the immersive video.

Figure 7:
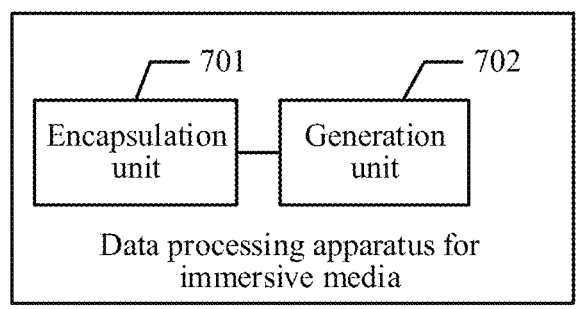
FIG. 7 is a schematic structural diagram of another data processing apparatus for immersive media according to certain embodiment(s) of the present disclosure.

Based on the embodiments of the data processing method and data process apparatus for immersive media, an embodiment of the present disclosure provides another data processing apparatus for immersive media. The data processing apparatus for immersive media may be a computer program (including program code) running in a content production device. For example, the data processing apparatus for immersive media may be application software in the content production device. Refer to FIG. 7 which is a schematic structural diagram of another data processing apparatus for immersive media according to an embodiment of the present disclosure. The data processing apparatus shown in FIG. 7 can operate the following units: an encapsulation unit 701 configured to encapsulate the immersive media into M tracks, the immersive media being formed by images taken by N cameras from different views, images from at least one camera being encapsulated in one track, the M tracks belonging to a same track group, N and M being integers greater than or equal to 1; and a generation unit 702 configured to generate a free-view information data box corresponding to an $i^{th}$ track according to an encapsulation process of w images in the $i^{th}$ track, the free-view information data box including view information corresponding to the $i^{th}$ track; $1 \leq i \leq M$, and $w \geq 1$.

In an embodiment, the free-view information data box corresponding to the $i^{th}$ track includes free-view track group information, the free-view track group information including a first camera identification field and an image type field, and the encapsulation unit 701, when generating a free-view information data box corresponding to an $i^{th}$ track according to an encapsulation process of w images in the $i^{th}$ track, performs the following steps: determining that the w images are from k cameras, k being an integer greater than 1; storing identification information of a $j^{th}$ camera in the k cameras in the first camera identification field; and determining the image type field according to an image type to which an image captured by the $j^{th}$ camera belongs, the image type including at least one of a depth image and a texture image.

In an embodiment, the encapsulation unit 701, when determining the image type field according to an image type to which an image captured by the $j^{th}$ camera belongs, performs the following steps: setting the image type field to a second value when the image type to which the image captured by the $j^{th}$ camera belongs is the texture image; setting the image type field to a third value when the image type to which the image captured by the $j^{th}$ camera belongs is the depth image; and setting the image type field to a fourth value when the image type to which the image captured by the $j^{th}$ camera belongs is the texture image and the depth image.

In an embodiment, the free-view information corresponding to the $i^{th}$ track includes a video stitching layout indication field, the w images include a texture image and a depth image, and the encapsulation unit 701, when generating a free-view information data box corresponding to an $i^{th}$ track according to an encapsulation process of w images in the $i^{th}$ track, performs the following steps: setting the video stitching layout indication field to a first value when or in response to a determination that the texture image and the depth image included in the $i^{th}$ track are encoded by stitching; and setting the video stitching layout indication field to a second value when or in response to a determination that the texture image and the depth image included in the $i^{th}$ track are separately encoded.

In an embodiment, the view information corresponding to the $i^{th}$ track further includes a camera model field; the encapsulation unit 701, when generating a free-view information data box corresponding to an $i^{th}$ track according to an encapsulation process of w images in the $i^{th}$ track, performs the following steps: setting the camera model field to the first value when or in response to a determination that a camera model to which a camera capturing the w images belongs is a first model; and setting the camera model field to the second value when or in response to a determination that the camera model to which the camera capturing the w images belongs is a second model.

In an embodiment, the free-view information corresponding to the $i^{th}$ track further includes a guard band width field of the texture image and a guard band width field of the depth image, and the encapsulation unit 701, when generating a free-view information data box corresponding to an $i^{th}$ track according to an encapsulation process of w images in the $i^{th}$ track, performs the following steps: acquiring a guard band width of the texture image used to encode the texture image in the $i^{th}$ track, and storing the guard band width of the texture image in the guard band width field of the texture image; and acquiring a guard band width of the depth image used to encode the depth image in the $i^{th}$ track, and storing the guard band width of the depth image in the guard band width field of the depth image.

In an embodiment, the free-view information corresponding to the $i^{th}$ track further includes a second camera identification field and a camera attribute information field, and the encapsulation unit 701, when generating a free-view information data box corresponding to an $i^{th}$ track according to an encapsulation process of w images in the $i^{th}$ track, performs the following steps: storing identification information of a $j^{th}$ camera in the k cameras in the second camera identification field, k denoting a quantity of cameras that the w images are from; and acquiring camera attribute information of the $j^{th}$ camera, and storing the acquired camera attribute information in the camera attribute information field; the camera attribute information of the $j^{th}$ camera including any one or more of the following: a quadrature-axis component value, a direct-axis component value, and a vertical-axis component value of a position of the $j^{th}$ camera, a quadrature-axis component value and a direct-axis component value of a focal length of the $j^{th}$ camera, and a width and a height of resolution of the image captured by the $j^{th}$ camera.

In an embodiment, the free-view information corresponding to the $i^{th}$ track further includes an image information field, and the encapsulation unit 701, when generating a free-view information data box corresponding to an $i^{th}$ track according to an encapsulation process of w images in the $i^{th}$ track, performs the following step: acquiring image information of the image captured by the $j^{th}$ camera, and storing the acquired image information in the image information field; the image information including one or more of the following: a downsample multiplication factor of the depth image, an offset of an upper left vertex of the depth image from an origin of a plane frame, and an offset of an upper left vertex of the texture image from the origin of the plane frame.

In an embodiment, the view information corresponding to the $i^{th}$ track further includes a custom camera parameter field, a custom camera parameter type field, and a custom camera parameter length field; the encapsulation unit 701, when generating a free-view information data box corresponding to an $i^{th}$ track according to an encapsulation process of w images in the $i^{th}$ track, performs the following steps: acquiring an $f^{th}$ custom camera parameter, and storing the $f^{th}$ custom camera parameter in the custom camera parameter field, f being an integer greater than or equal to 0 and less than h, h denoting a quantity of custom camera parameters of the $j^{th}$ camera; and determining a parameter type to which the $f^{th}$ custom camera parameter belongs and a length of the $f^{th}$ custom camera parameter, storing the parameter type to which the $f^{th}$ custom camera parameter belongs in the custom camera parameter type field, and storing the length of the $f^{th}$ custom camera parameter in the custom camera parameter length field.

In an embodiment, the generation unit 702 is further configured to: generate a signaling description file corresponding to the immersive media, the signaling description file including a free-view camera descriptor corresponding to the immersive media, the free-view camera descriptor being used for recording camera attribute information corresponding to a video clip in each track, the video clip in any track being formed by images encapsulated in the any track; and the free-view camera descriptor being encapsulated in an adaptation set level of a media presentation description file of the immersive media, or the signaling description file being encapsulated in a representation level of the media presentation description file.

In an embodiment, the data processing apparatus for immersive media further includes a transmission unit 703 configured to transmit the signaling description file to a content consumption device to instruct the content consumption device to select, based on the camera attribute information corresponding to the video clip in each track recorded in the free-view camera descriptor, a candidate camera matching position information of a user from the cameras, and transmit a first resource request for acquiring segmented video from the candidate camera; and select, in response to the first resource request, the $i^{th}$ track from the M tracks according to view information in a free-view information data box corresponding to each track and transmit the free-view information data box corresponding to the $i^{th}$ track to the content consumption device.

In an embodiment, the transmission unit 703 is further configured to: transmit the signaling description file to a content consumption device to instruct the content consumption device to transmit a second resource request according to the signaling description file and a user bandwidth; and transmit M free-view information data boxes corresponding to the M tracks to the content consumption device in response to the second resource request, to instruct the content consumption device to acquire, according to view information in a free-view information data box corresponding to each track and position information of a user, the free-view information data box corresponding to the $i^{th}$ track from the M free-view information data boxes.

According to an embodiment of the present disclosure, the steps involved in the data processing method for immersive media shown in FIG. 5 may be performed by the units in the data processing apparatus for immersive media shown in FIG. 7. For example, S501 in FIG. 5 may be performed by the encapsulation unit 701 in the data processing apparatus in FIG. 7, and S502 may be performed by the generation unit 702 in the data processing apparatus in FIG. 7.

According to another embodiment of the present disclosure, units of the system for data processing apparatus for immersive media shown in FIG. 7 may be separately or wholly combined into one or several other units, or one (or more) of the units herein may further be divided into multiple units of smaller functions. In this way, same operations can be implemented, and implementation of the technical effects of the embodiments of the present disclosure is not affected. The units are divided based on logical functions. A function of one unit may also be implemented by a plurality of units, or functions of a plurality of units are implemented by one unit. In other embodiments of the present disclosure, the data processing apparatus for immersive media may also include other units. The functions may also be cooperatively implemented by other units and may be cooperatively implemented by a plurality of units.

According to another embodiment of the present disclosure, a computer program (including program code) that can perform the steps in the corresponding method shown in FIG. 5 may be run on a general computing device, such as a computer, which includes processing elements and storage elements such as a central processing unit (CPU), a random access memory (RAM), and a read-only memory (ROM), to construct the data processing apparatus for immersive media shown in FIG. 7 and implement the data processing method for immersive media in the embodiments of the present disclosure. The computer program may be recorded in, for example, a computer-readable storage medium, and may be loaded into the computing device by using the computer-readable storage medium, and run on the computing device.

In the embodiments of the present disclosure, immersive media are encapsulated into M tracks, the immersive media are formed by images taken by N cameras from different views, one track may include images from at least one camera, and the M tracks belong to a same track group, which realizes a scene of encapsulating an immersive video into a plurality of tracks. In addition, the content production device generates a free-view information data box for each track, and indicates view information corresponding to an $i^{th}$ track through the free-view information data box corresponding to the $i^{th}$ track, for example, a specific view position of the camera, and when the content consumption device decodes and displays the images in the track according to the view information corresponding to the $i^{th}$ track, decoded and displayed video can be ensured to better match a position of a user, which improves a presentation effect of the immersive video.

Figure 8:
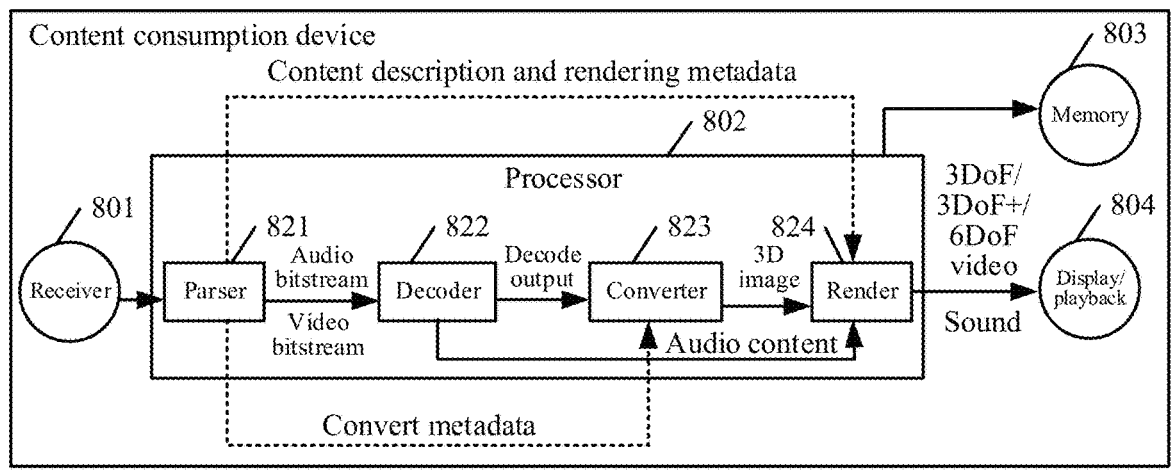
FIG. 8 is a schematic structural diagram of a content consumption device according to certain embodiment(s) of the present disclosure.

Refer to FIG. 8 which is a schematic structural diagram of a content consumption device according to an embodiment of the present disclosure. The content consumption device shown in FIG. 8 may refer to a computing device used by a user of immersive media. The computing device may be a terminal. The content consumption device shown in FIG. 8 may include a receiver 801, a processor 802, a memory 803, and a display/playback apparatus 804.

The receiver 801 is configured to realize transmission interaction between decoding and other devices, and configured to realize transmission of the immersive media between a content production device and the content consumption device. That is, the content consumption device receives, through the receiver 801, related media resources of the immersive media transmitted by the content production device.

The processor 802 or central processing unit (CPU) is a processing core of the content production device. The processor 802 is adapted to implement one or more computer programs, and adapted to load and execute one or more computer programs to realize procedures of the data processing method for immersive media shown in FIG. 4.

The memory 803 is a storage device in the content consumption device and configured to store computer programs and media resources. It may be understood that the memory 803 herein may include an internal storage medium of the content consumption device and may also include an extended storage medium supported by the content consumption device. The memory 803 may be a high-speed RAM or may be a non-volatile memory, for example, at least one magnetic disk memory; in certain embodiment(s), the memory may also be at least one memory far away from the processor. The memory 803 provides a storage space, storing an operating system of the content consumption device. Moreover, the storage space is further configured to store a computer program. The computer program is adapted to be invoked and executed by the processor to perform the steps in the data processing method for immersive media. In addition, the memory 803 may be further configured to store a 3D image of the immersive media formed after processing by the processor, audio content corresponding to the 3D image, information desired for rendering the 3D image and the audio content, and the like.

The display/playback apparatus 804 is configured to output sound and a 3D image obtained by rendering.

In an embodiment, the processor 802 may include a parser 821, a decoder 822, a converter 823, and a renderer 824.

The parser 821 is configured to decapsulate an encapsulated file for rendering media from the content production device, and to decapsulate media file resources according to a file format of the immersive media to obtain an audio bitstream and a video bitstream; and provide the audio bitstream and the video bitstream for the decoder 822.

The decoder 822 performs audio decoding on the audio bitstream to obtain audio content and provides the audio content for the render 824 for audio rendering. In addition, the decoder 822 decodes the video bitstream to obtain a 2D image. According to metadata provided by MPD, if the metadata indicates that the immersive media performs a regional encapsulation process, the 2D image refers to an encapsulated image. If the metadata indicates that the immersive media does not perform the regional encapsulation process, the 2D image refers to a projected image.

The converter 823 is configured to convert the 2D image into a 3D image. If the immersive media performs the regional encapsulation process, the converter 823 may first regionally decapsulate the encapsulated image to obtain the projected image. The projected image is reconstructed to obtain the 3D image. If the immersive media does not perform the regional encapsulation process, the converter 823 may directly reconstruct the projected image to obtain the 3D image.

The render 824 may render the audio content of the immersive media and the 3D image. In certain embodiment(s), the audio content and the 3D image are rendered according to rendering and window related metadata in the MPD, and are outputted by the display/playback apparatus upon performance of the rendering.

In an embodiment, the processor 802 invokes one or more computer programs in the memory to perform the steps in the data processing method for immersive media shown in FIG. 4. In certain embodiment(s), the memory stores one or more computer programs. The one or more computer programs are adapted to be loaded by the processor 802 and perform the following steps: acquiring a free-view information data box corresponding to an $i^{th}$ track, the free-view information data box including view information corresponding to the $i^{th}$ track, i being an integer greater than or equal to 1 and less than or equal to M; the immersive media being formed by images taken by N cameras from different views, the immersive media being encapsulated into M tracks, images from at least one camera being encapsulated in one track, N and M being integers greater than 1; and decoding and displaying images encapsulated in the $i^{th}$ track according to the view information in the free-view information data box.

In the embodiments of the present disclosure, immersive media are encapsulated into M tracks, the immersive media are formed by images taken by N cameras from different views, one track may include images from at least one camera, and the M tracks belong to a same track group, which realizes a scene of encapsulating an immersive video into a plurality of tracks. In addition, the content production device generates a free-view information data box for each track, and indicates view information corresponding to an $i^{th}$ track through the free-view information data box corresponding to the $i^{th}$ track, for example, a specific view position of the camera, and when the content consumption device decodes and displays the images in the track according to the view information corresponding to the $i^{th}$ track, decoded and displayed video can be ensured to better match a position of a user, which improves a presentation effect of the immersive video.

Figure 9:
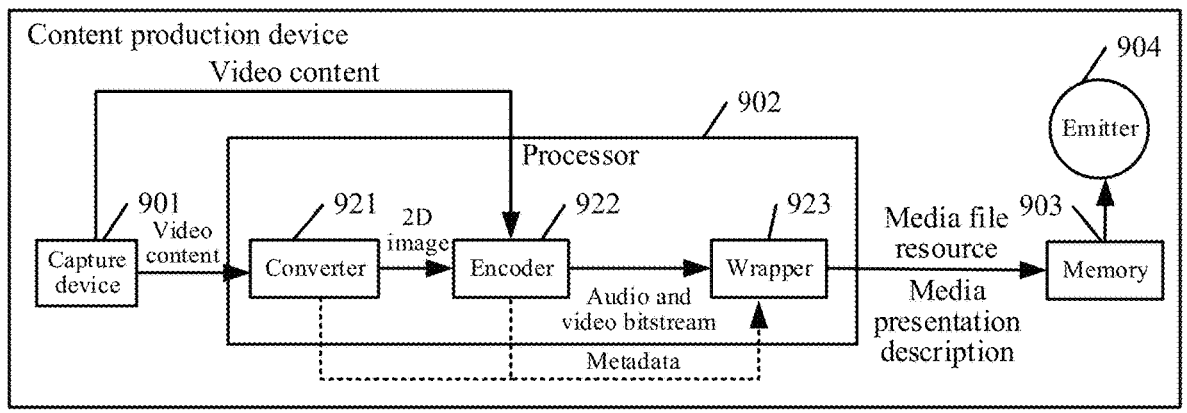
FIG. 9 is a schematic structural diagram of a content production device according to certain embodiment(s) of the present disclosure.

Refer to FIG. 9 which is a schematic structural diagram of a content production device according to an embodiment of the present disclosure. The content production device may refer to a computing device used by a provider of immersive media. The computing device may be a terminal or a server. As shown in FIG. 9, the content production device may include a capture device 901, a processor 902, a memory 903, and an emitter 904.

The capture device 901 is configured to capture real-world sound-visual scenes to obtain raw data of immersive media (including audio content and video content synchronized in time and space). The capture device 901 may include, but is not limited to, an audio device, a camera device, and a sensor device. The audio device may include an audio sensor, a microphone, and the like. The camera device may include an ordinary camera, a stereo camera, a light field camera, and the like. The sensor device may include a laser device, a radar device, and the like.

The processor 902 (or referred to as a central processing unit (CPU)) is a processing core of the content production device. The processor 902 is adapted to implement one or more computer programs, and adapted to load and execute one or more computer programs to realize procedures of the data processing method for immersive media shown in FIG. 4.

The memory 903 is a storage device in the content production device and configured to store programs and media resources. It may be understood that the memory 903 herein may include built-in storage medium in the content production device and may also include an extended storage medium supported by the content production device. The memory may be a high-speed RAM, or may be a non-volatile memory, for example, at least one magnetic disk; in certain embodiment(s), the memory may also be at least one memory far away from the processor. The memory provides a storage space, storing an operating system of the content production device. Moreover, the storage space is further configured to store a computer program. The computer program includes program instructions, and the program instructions are adapted to be invoked and executed by the processor to perform the steps in the data processing method for immersive media. In addition, the memory 903 may be further configured to store an immersive media file formed after processing by the processor. The immersive media file includes media file resources and MPD.

The emitter 904 is configured to realize transmission interaction between the content production device and other devices, and configured to realize transmission of the immersive media between the content production device and a content consumption device. That is, the content production device transmits, through the emitter 904, related media resources of the immersive media to the content consumption device.

Referring to FIG. 9 again, the processor 902 may include a converter 921, an encoder 922, and a wrapper 923.

The converter 921 is configured to perform a series of conversion processing on captured video content to make the video content become content suitable for video coding of to-be-executed immersive media. The conversion processing may include: stitching and projection. In certain embodiment(s), the conversion processing further includes regional encapsulation. The converter 921 may convert captured 3D video content into a 2D image, and provide the 2D image for the encoder for video coding.

The encoder 922 is configured to perform audio coding on the captured audio content to form an audio bitstream of the immersive media, and is further configured to perform video coding on the 2D image obtained through conversion by the converter 921 to obtain a video bitstream.

The wrapper 923 is configured to encapsulate the audio bitstream and the video bitstream into a file container according to a file format (e.g., an ISOBMFF) of the immersive media to form media file resources of the immersive media. The media file resources may be a media file or a media file of the immersive media formed by media fragments; and record metadata of the media file resources of the immersive media according to a file format desirable of the immersive media by using MPD. An encapsulated file of the immersive media obtained through processing by the wrapper may be stored in the memory, and provided for the content consumption device on demand for presentation of the immersive media.

In an embodiment, the processor 902 invokes one or more instructions in the memory to perform the steps in the data processing method for immersive media shown in FIG. 5. In certain embodiment(s), the memory 903 stores one or more computer programs. The one or more computer programs are adapted to be loaded by the processor 902 and perform, but not limited to, the following steps: encapsulating the immersive media into M tracks, the immersive media being formed by images taken by N cameras from different views, images from at least one camera being encapsulated in one track, the M tracks belonging to a same track group, N and M being integers greater than or equal to 1; and generating a free-view information data box corresponding to an $i^{th}$ track according to an encapsulation process of w images in the $i^{th}$ track, the free-view information data box including view information corresponding to the $i^{th}$ track; $1 \leq i \leq M$, and $w \geq 1$.

In the embodiments of the present disclosure, immersive media are encapsulated into M tracks, the immersive media are formed by images taken by N cameras from different views, one track may include images from at least one camera, and the M tracks belong to a same track group, which realizes a scene of encapsulating an immersive video into a plurality of tracks. In addition, the content production device generates a free-view information data box for each track, and indicates view information corresponding to an $i^{th}$ track through the free-view information data box corresponding to the $i^{th}$ track, for example, a specific view position of the camera, and when the content consumption device decodes and displays the images in the track according to the view information corresponding to the $i^{th}$ track, decoded and displayed video can be ensured to better match a position of a user, which improves a presentation effect of the immersive video.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

In addition, an embodiment of the present disclosure further provides a storage medium. The storage medium is configured to store a computer program. The computer program is configured to perform the methods provided in the embodiments.

An embodiment of the present disclosure further provides a computer program product including instructions, the instructions, when run on a computer, causing the computer to perform the method according to the embodiments.

What is disclosed is merely exemplary embodiments of the present disclosure, and is not intended to limit the protection scope of the present disclosure. Therefore, equivalent variations made in accordance with the claims of the present disclosure shall fall within the scope of the present disclosure.

What is claimed is:

1. A data processing method for immersive media, the method being performed by a content consumption device, the immersive media being formed by images taken by N cameras from different views, the immersive media being encapsulated into M tracks, images from at least one camera being encapsulated in one track, N and M being integers greater than 1, the method comprising:
acquiring a free-view information data box corresponding to an $i^{th}$ track of the immersive media, the free-view information data box including view information corresponding to the $i^{th}$ track, i being an integer greater than or equal to 1 and less than or equal to M, the view information corresponding to the $i^{th}$ track further including a camera model field, a camera model value comprised in the camera model field indicating a camera parameter model of a first camera, the camera parameter model comprising a first camera parameter model or a second camera parameter model, the second camera parameter model being different from the first camera parameter model, wherein the camera model field comprises a single-bit field;
decoding images encapsulated in the $i^{th}$ track according to the view information in the free-view information data box; and
acquiring a signaling description file corresponding to the immersive media, the signaling description file including a free-view camera descriptor corresponding to the immersive media, the free-view camera descriptor being used for recording camera attribute information corresponding to a video clip in each track, wherein the free-view camera descriptor is encapsulated in an adaptation set level of a media presentation description file of the immersive media, or the signaling description file is encapsulated in a representation level of the media presentation description file.

2. The method according to claim 1, wherein
images from k of the N cameras are encapsulated in the $i^{th}$ track, k being an integer greater than 0, and
free-view track group information corresponding to the $i^{th}$ track is further encapsulated in the $i^{th}$ track, the free-view track group information being used for indicating that the $i^{th}$ track and other tracks in which the immersive media are encapsulated belong to a same track group, the free-view track group information including a first camera identification field and an image type field, the first camera identification field being used for storing identification information of a $j^{th}$ camera in the k cameras, the image type field being used for indicating an image type to which an image captured by the $j^{th}$ camera belongs, and the image type including at least one of a texture image and a depth image.

3. The method according to claim 2, wherein
in response to a determination that the $i^{th}$ track comprises the texture image and the depth image, the view information corresponding to the $i^{th}$ track includes a video stitching layout indication field;
in response to a determination that the video stitching layout indication field is a first value, the texture image and the depth image included in the $i^{th}$ track are encoded by stitching; and
in response to a determination that the video stitching layout indication field is a second value, the texture image and the depth image included in the $i^{th}$ track are separately encoded.

4. The method according to claim 2, wherein
the first camera corresponds to the $j^{th}$ camera,
in response to a determination that the camera model field comprises a first camera model value, the camera parameter model is the first camera parameter model; and
in response to a determination that the camera model field comprises a second camera model value, the camera parameter model is the second camera parameter model.

5. The method according to claim 2, wherein the view information corresponding to the $i^{th}$ track further includes a guard band width field of the texture image and a guard band width field of the depth image, the guard band width field of the texture image being used for storing a guard band width used to encode the texture image in the $i^{th}$ track, the guard band width field of the depth image being used for storing a guard band width used to encode the depth image in the $i^{th}$ track.

6. The method according to claim 2, wherein
the view information corresponding to the $i^{th}$ track further includes a second camera identification field and a camera attribute information field;
the second camera identification field being used for storing identification information of the $j^{th}$ camera;
the camera attribute information field being used for storing camera attribute information of the $j^{th}$ camera, the camera attribute information of the $j^{th}$ camera including one or more of a quadrature-axis component value of a position of the $j^{th}$ camera, a direct-axis component value of the position of the $j^{th}$ camera, a vertical-axis component value of the position of the $j^{th}$ camera, a quadrature-axis component value of a focal length of the $j^{th}$ camera, a direct-axis component value of the focal length of the $j^{th}$ camera, a width of resolution of the image captured by the $j^{th}$ camera, or a height of the resolution of the image captured by the $j^{th}$ camera.

7. The method according to claim 2, wherein the view information corresponding to the $i^{th}$ track further includes an image information field, the image information field being used for storing image information of the image captured by the $j^{th}$ camera, the image information including one or more of a downsample multiplication factor of the depth image, an offset of an upper left vertex of the depth image from an origin of a plane frame, and an offset of an upper left vertex of the texture image from the origin of the plane frame.

8. The method according to claim 2, wherein the view information corresponding to the $i^{th}$ track further includes a custom camera parameter field, a custom camera parameter type field, and a custom camera parameter length field; the custom camera parameter field being used for storing an $f^{th}$ custom camera parameter of the $j^{th}$ camera, f being an integer greater than or equal to 0 and less than h, h denoting a quantity of custom camera parameters of the $j^{th}$ camera, the custom camera parameter type field being used for storing a parameter type to which the $f^{th}$ custom camera parameter belongs, and the custom camera parameter length field being used for storing a length of the $f^{th}$ custom camera parameter.

9. The method according to claim 1, wherein the video clip in the track is formed by a texture image and a depth image comprised in the track.

10. The method according to claim 9, wherein acquiring the free-view information data box comprises:
selecting, based on the camera attribute information corresponding to the video clip in each track recorded in the free-view camera descriptor, a candidate camera matching position information of a user from the N cameras;
transmitting a first resource request for acquiring segmented video from the candidate camera to a content production device, the first resource request being used for instructing the content production device to select, according to the view information in the free-view information data box corresponding to each of the M tracks, the $i^{th}$ track from the M tracks and return the free-view information data box corresponding to the $i^{th}$ track, at least one of the texture image and the depth image encapsulated in the $i^{th}$ track being from the candidate camera; and
receiving the free-view information data box corresponding to the $i^{th}$ track returned by the content production device.

11. The method according to claim 9, wherein acquiring the free-view information data box comprises:
transmitting a second resource request to a content production device based on the signaling description file and a user bandwidth, the second resource request being used for instructing the content production device to return M free-view information data boxes of the M tracks, one track corresponding to one free-view information data box; and
acquiring, according to the view information in the free-view information data box corresponding to each track and position information of a user, the free-view information data box corresponding to the $i^{th}$ track from the M free-view information data boxes.

12. A data processing apparatus for immersive media, the immersive media being formed by images taken by N cameras from different views, the immersive media being encapsulated into M tracks, images from at least one camera being encapsulated in one track, N and M being integers greater than 1; the apparatus comprising: a memory storing computer program instructions; and a processor coupled to the memory and configured to execute the computer program instructions and perform:
acquiring a free-view information data box corresponding to an $i^{th}$ track of the immersive media, the free-view information data box including view information corresponding to the $i^{th}$ track, i being an integer greater than or equal to 1 and less than or equal to M, the view information corresponding to the $i^{th}$ track further including a camera model field, a camera model value comprised in the camera model field indicating a camera parameter model of a first camera, the camera parameter model comprising a first camera parameter model or a second camera parameter model, the second camera parameter model being different from the first camera parameter model, wherein the camera model field comprises a single-bit field;
decoding images encapsulated in the $i^{th}$ track according to the view information in the free-view information data box; and
acquiring a signaling description file corresponding to the immersive media, the signaling description file including a free-view camera descriptor corresponding to the immersive media, the free-view camera descriptor being used for recording camera attribute information corresponding to a video clip in each track, wherein the free-view camera descriptor is encapsulated in an adaptation set level of a media presentation description file of the immersive media, or the signaling description file is encapsulated in a representation level of the media presentation description file.

13. The apparatus according to claim 12, wherein
images from k of the N cameras are encapsulated in the $i^{th}$ track, k being an integer greater than 0, and
free-view track group information corresponding to the $i^{th}$ track is further encapsulated in the $i^{th}$ track, the free-view track group information being used for indicating that the $i^{th}$ track and other tracks in which the immersive media are encapsulated belong to a same track group, the free-view track group information including a first camera identification field and an image type field, the first camera identification field being used for storing identification information of a $j^{th}$ camera in the k cameras, the image type field being used for indicating an image type to which an image captured by the $j^{th}$ camera belongs, and the image type including at least one of a texture image and a depth image.

14. The apparatus according to claim 13, wherein
in response to a determination that the $i^{th}$ track comprises the texture image and the depth image, the view information corresponding to the $i^{th}$ track includes a video stitching layout indication field;
in response to a determination that the video stitching layout indication field is a first value, the texture image and the depth image included in the $i^{th}$ track are encoded by stitching; and
in response to a determination that the video stitching layout indication field is a second value, the texture image and the depth image included in the $i^{th}$ track are separately encoded.

15. The apparatus according to claim 13, wherein
the first camera corresponds to the $j^{th}$ camera,
in response to a determination that the camera model field comprises a first camera model value, the camera parameter model is the first camera parameter model; and
in response to a determination that the camera model field comprises a second camera model value, the camera parameter model is the second camera parameter model.

16. The apparatus according to claim 13, wherein the view information corresponding to the $i^{th}$ track further includes a guard band width field of the texture image and a guard band width field of the depth image, the guard band width field of the texture image being used for storing a guard band width used to encode the texture image in the $i^{th}$ track, the guard band width field of the depth image being used for storing a guard band width used to encode the depth image in the $i^{th}$ track.

17. The apparatus according to claim 13, wherein
the view information corresponding to the $i^{th}$ track further includes a second camera identification field and a camera attribute information field;

the second camera identification field being used for storing identification information of the $j^{th}$ camera;

the camera attribute information field being used for storing camera attribute information of the $j^{th}$ camera, the camera attribute information of the $j^{th}$ camera including one or more of a quadrature-axis component value of a position of the $j^{th}$ camera, a direct-axis component value of the position of the $j^{th}$ camera, a vertical-axis component value of the position of the $j^{th}$ camera, a quadrature-axis component value of a focal length of the $j^{th}$ camera, a direct-axis component value of the focal length of the $j^{th}$ camera, a width of resolution of the image captured by the $j^{th}$ camera, or a height of the resolution of the image captured by the $j^{th}$ camera.

18. The apparatus according to claim 13, wherein the view information corresponding to the $i^{th}$ track further includes an image information field, the image information field being used for storing image information of the image captured by the $j^{th}$ camera, the image information including one or more of a downsample multiplication factor of the depth image, an offset of an upper left vertex of the depth image from an origin of a plane frame, and an offset of an upper left vertex of the texture image from the origin of the plane frame.

19. A non-transitory computer-readable storage medium storing computer program instructions executable by at least one processor to perform:

acquiring a free-view information data box corresponding to an $i^{th}$ track of immersive media, the free-view information data box including view information corresponding to the $i^{th}$ track, i being an integer greater than or equal to 1 and less than or equal to M, the view information corresponding to the $i^{th}$ track further including a camera model field, a camera model value comprised in the camera model field indicating a camera parameter model of a first camera, the camera parameter model comprising a first camera parameter model or a second camera parameter model, the second camera parameter model being different from the first camera parameter model, wherein the camera model field comprises a single-bit field;

decoding images encapsulated in the $i^{th}$ track according to the view information in the free-view information data box, the immersive media being formed by images taken by N cameras from different views, the immersive media being encapsulated into M tracks, images from at least one camera being encapsulated in one track, N and M being integers greater than 1; and acquiring a signaling description file corresponding to the immersive media, the signaling description file including a free-view camera descriptor corresponding to the immersive media, the free-view camera descriptor being used for recording camera attribute information corresponding to a video clip in each track, wherein the free-view camera descriptor is encapsulated in an adaptation set level of a media presentation description file of the immersive media, or the signaling description file is encapsulated in a representation level of the media presentation description file.

* * * * *